United States Patent [19]
Miyake

[11] Patent Number: 6,157,749
[45] Date of Patent: Dec. 5, 2000

[54] IMAGE PROCESSING APPARATUS AND METHOD, AND STORING MEDIUM

[75] Inventor: Nobutaka Miyake, Yokohama, Japan

[73] Assignee: Canon Kabushiki Kaisha, Tokyo, Japan

[21] Appl. No.: 09/033,584

[22] Filed: Mar. 3, 1998

[30] Foreign Application Priority Data

Mar. 5, 1997 [JP] Japan ................................... 9-050198
Jun. 4, 1997 [KP] DPR of Korea ....................... 9-146719

[51] Int. Cl.$^7$ ..................................................... G06K 9/32
[52] U.S. Cl. ........................... 382/300; 382/165; 382/299
[58] Field of Search .................................. 382/300, 161, 382/165, 222, 254, 264, 270, 274, 299; 345/132, 435, 439; 358/455, 466, 467

[56] References Cited

U.S. PATENT DOCUMENTS

| | | | |
|---|---|---|---|
| 4,751,585 | 6/1988 | Shibazaki ................................ | 358/294 |
| 4,803,558 | 2/1989 | Hiratsuka et al. ...................... | 358/283 |
| 5,054,100 | 10/1991 | Tai .......................................... | 382/47 |
| 5,363,213 | 11/1994 | Coward et al. ......................... | 358/455 |
| 5,410,615 | 4/1995 | Mailloux ................................ | 382/41 |
| 5,418,899 | 5/1995 | Aoki et al. .............................. | 395/139 |
| 5,430,811 | 7/1995 | Fukushima et al. .................... | 382/254 |
| 5,481,275 | 1/1996 | Mical et al. ............................. | 345/132 |
| 5,499,327 | 3/1996 | Satoh ....................................... | 395/135 |
| 5,583,659 | 12/1996 | Lee et al. ................................ | 358/455 |
| 5,650,858 | 7/1997 | Lund ....................................... | 358/298 |
| 5,760,921 | 6/1998 | Miyake ................................... | 358/458 |
| 5,889,894 | 3/1999 | Ito et al. ................................. | 382/300 |

FOREIGN PATENT DOCUMENTS

| | | |
|---|---|---|
| 0645736 | 3/1995 | European Pat. Off. . |
| 0744861 | 11/1996 | European Pat. Off. . |
| 0803841 | 10/1997 | European Pat. Off. . |
| 61-56665 | 3/1986 | Japan . |

*Primary Examiner*—Bhavesh Mehta
*Assistant Examiner*—Kanji Patel
*Attorney, Agent, or Firm*—Fitzpatrick, Cella, Harper & Scinto

[57] ABSTRACT

This invention can easily form a smooth clear image with continuity particularly from a natural image without causing any interpolation blur or jaggy when converting input low-resolution information into high-resolution information. This invention includes a first window forming unit (102) for forming a first window for referring to nearest neighbor pixels of a low-resolution pixel of interest, a detecting unit (103) for detecting a plurality of representative values from the first window, a converting unit (105) for converting the value of the pixel of interest by an adaptive LPF, a second window forming unit (106) for forming a second window for referring to the converted values of the nearest neighbor pixels including the pixel of interest, and a high-resolution information forming unit (107) including a linear interpolating unit for performing linear interpolation on the basis of the pixel value information in the first window or the converted value information in the second window and a nonlinear interpolating unit for performing nonlinear interpolation by a product-sum operation of the linearly interpolated values from the linear interpolating unit and the representative values.

30 Claims, 29 Drawing Sheets

FIG.2

| A | B | C | D | E |
|---|---|---|---|---|
| F | G | H | I | J |
| K | L | M* | N | O |
| P | Q | R | S | T |
| U | V | W | X | Y |

FIG.3

| 1 | 1 | 1 |
|---|---|---|
| 1 | 1 | 1 |
| 1 | 1 | 1 |

FIG.4

| G' | H' | I' |
|----|----|----|
| L' | M' | N' |
| Q' | R' | S' |

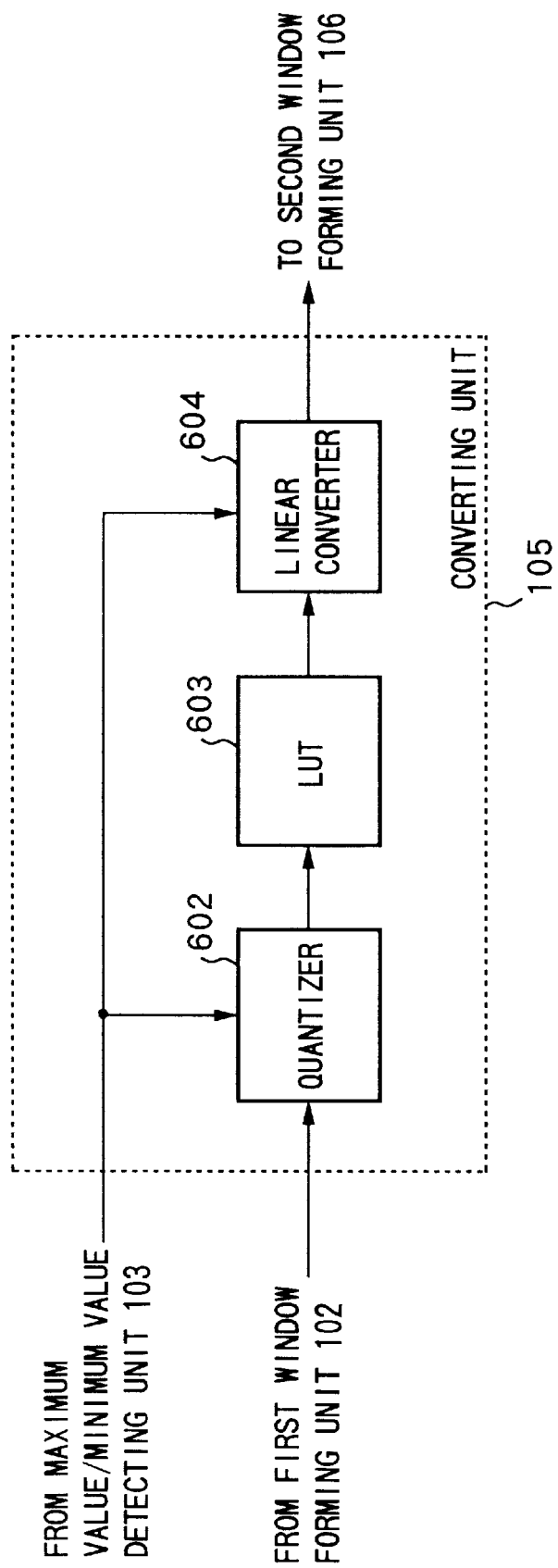

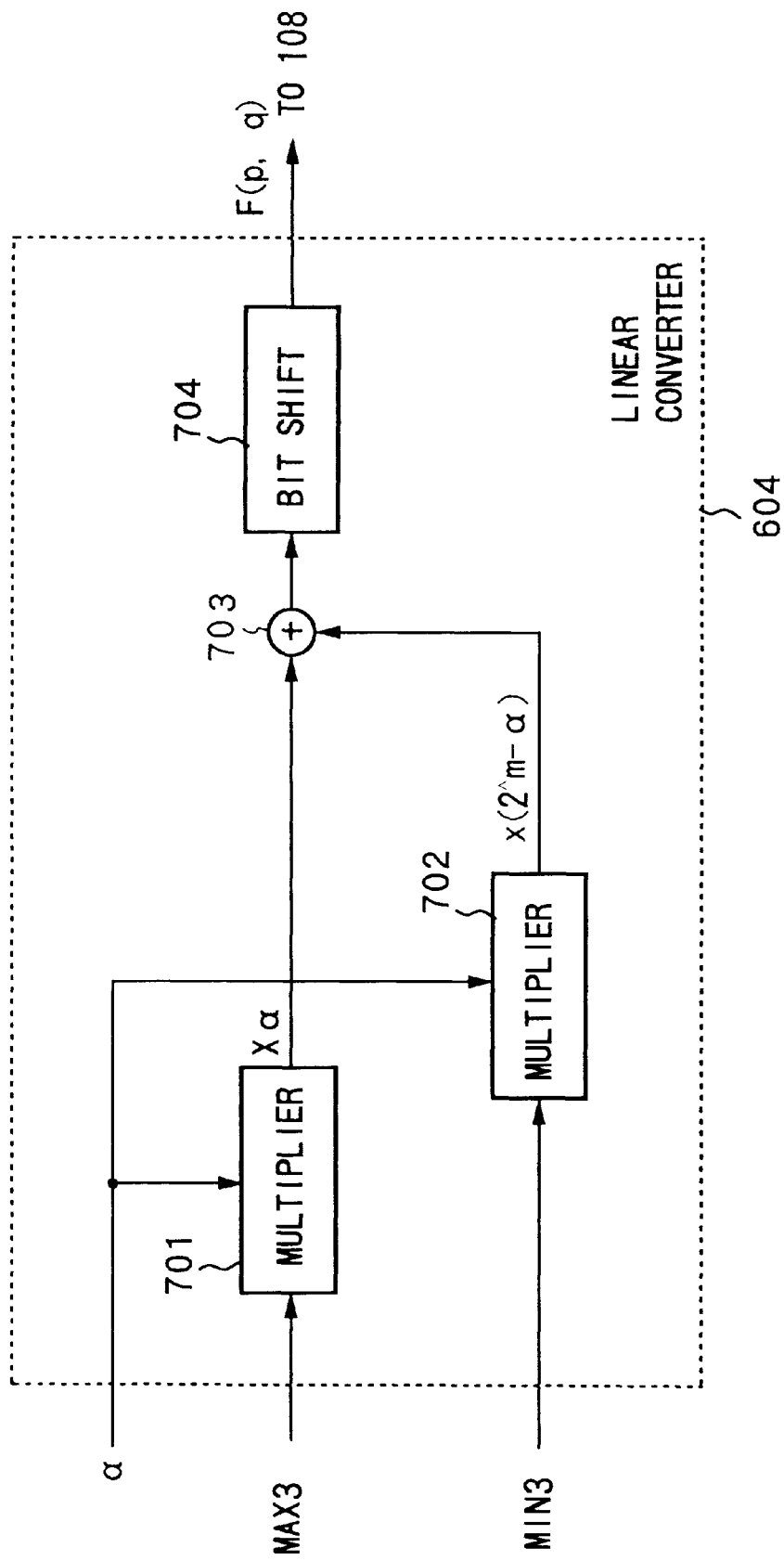

| | | | | | | | |
|---|---|---|---|---|---|---|---|
| 1 | 1 | 1 | | 1 | 1 | 1 | |
| 0 | 1 | 1 | → 141 | 1 | 1 | 1 | → 240 |
| 0 | 0 | 0 | | 0 | 0 | 1 | |

| | | | | | | | |
|---|---|---|---|---|---|---|---|
| 1 | 1 | 1 | | 0 | 0 | 1 | |
| 0 | 1 | 1 | → 170 | 0 | 0 | 0 | → 5 |
| 0 | 0 | 1 | | 0 | 0 | 0 | |

| | | | | | | | |
|---|---|---|---|---|---|---|---|
| 1 | 1 | 1 | | 0 | 1 | 1 | |
| 1 | 1 | 1 | → 250 | 0 | 0 | 0 | → 10 |
| 0 | 1 | 1 | | 0 | 0 | 0 | |

| | | | |
|---|---|---|---|
| 1 | 1 | 1 | |
| 0 | 0 | 1 | → 90 |
| 0 | 0 | 0 | |

FIG.21

| SELECTION ITEM / CLASSIFICATION | ZERO ORDER INTERPOLATION | LINEAR INTERPOLATION | NONLINEAR INTERPOLATION (FIRST WINDOW) | NONLINEAR INTERPOLATION (SECOND WINDOW) | COEFFICIENT a | COEFFICIENT b | COEFFICIENT c | COEFFICIENT d | COEFFICIENT e |
|---|---|---|---|---|---|---|---|---|---|
| ONE_LEVEL | ○ | — | — | — | — | — | — | — | — |
| FLAT | — | ○ | — | — | — | — | — | — | — |
| BI_EDGE | — | — | — | ○ | 1 | 0 | 8 | $-7/2$ | 0 |
| ART_EDGE | — | — | — | ○ | 7 | 1 | 4 | $-3/4$ | $-3/4$ |
| INDEX_EDGE | — | — | ○ | — | 1 | 1 | 2 | $-1/4$ | $-1/4$ |
| PICT_EDGE | — | — | ○ | — | 1 | 1 | 2 | 0 | $-1/2$ |

FIG.22

| SELECTION ITEM / CLASSIFICATION | ZERO ORDER INTERPOLATION | LINEAR INTERPOLATION | NONLINEAR INTERPOLATION | COEFFICIENT a | COEFFICIENT b | COEFFICIENT c | COEFFICIENT d | COEFFICIENT e |
|---|---|---|---|---|---|---|---|---|
| ONE_LEVEL | O | — | — | — | — | — | — | — |
| FLAT | — | O | — | — | — | — | — | — |
| BI_EDGE | — | — | O | 1 | 0 | 8 | −7/2 | 0 |
| ART_EDGE | — | — | O | 7 | 1 | 4 | −3/4 | −3/4 |
| INDEX_EDGE | — | — | O | 1 | 1 | 2 | −1/4 | −1/4 |
| PICT_EDGE | — | — | O | 1 | 1 | 2 | 0 | −1/2 |

J=MIN(|A-E|, |B-E|, |C-E|, |D-E|)
=|X-E|
(J IS OBSERVATION POINT AT SHORTEST
DISTANCE X FROM INTERPOLATION POINT)
INTERPOLATION POINT E=X

INTERPOLATION POINT E=(1-i)(1-j)A+i·(1-J)B+j·(1-i)C+ijD

INPUT INFORMATION

INFORMATION AFTER RESOLUTION
IS CONVERTED BY NEAREST NEIGHBOR
INTERPOLATION <2×2>

INFORMATION AFTER
RESOLUTION IS CONVERTED
BY BILINEAR INTERPOLATION<2×2>

| A | B | C |
|---|---|---|
| D | *E | F |
| G | H | I |

SOLID A

SOLID A

IMAGE PROCESSING APPARATUS AND METHOD, AND STORING MEDIUM

BACKGROUND OF THE INVENTION

The present invention relates to an image processing apparatus and an image processing method of enlarging input image information or converting input low-resolution information into high-resolution information.

Conventionally, various methods have been proposed as a method of converting input low-resolution information into high-resolution information. These conventional methods use different conversion processing methods in accordance with the types of images to be processed (e.g., a multivalue image having gradation information in units of pixels, a binary image formed by a pseudo halftone, a binary image formed by a fixed threshold value, and a character image). Examples of generally used conventional interpolation methods are nearest neighbor interpolation by which the same pixel values nearest to an interpolation point are arranged as shown in FIG. 23 and bilinear interpolation by which a pixel value E is determined by the following arithmetic operation in accordance with the distances of four points (having pixel values A, B, C, and D) surrounding an interpolation point as shown in FIG. 24.

$$E=(1-i)(1-j)A+i \cdot (1-j)B+j \cdot (1-i)C+ijD$$

(where i and j are respectively the distances from A in the lateral and longitudinal directions when the interpixel distance is 1. ($i \leq 1$, $j \leq 1$))

Unfortunately, the above conventional methods have the following drawbacks.

First, the method shown in FIG. 23 has the advantage that the process configuration is simple. However, when this method is used for natural images, for example, pixel values are determined in units of blocks to be enlarged. Therefore, blocks become visually conspicuous, and this deteriorates the image quality.

Also, even when the method is used for characters, line images, or CG (Computer Graphics) images, the same pixel value continues in units of blocks to be enlarged. Especially when an image contains an oblique line, staircasing called jaggy becomes prominent to deteriorate the image quality. FIGS. 25A and 25B show the way this jaggy occurs. FIG. 25A shows input information, and FIG. 25B shows an example of resolution conversion by which the number of pixels is doubled in both the row and column directions by the method shown in FIG. 23. Generally, the deterioration of image quality increases as the magnification increases. (Referring to FIGS. 25A and 25B, "200" and "10" are pixel values.)

The method shown in FIG. 24 is generally often used in enlarging natural images. In this method, averaged smoothed images are obtained. However, blurred images result when edges or sharp images are required. Additionally, when the method is used for an image obtained by scanning a map or the like or for a natural image containing characters, important information is sometimes not transferred to the user due to a blur caused by interpolation.

Figures 25A, 25B, 25C:
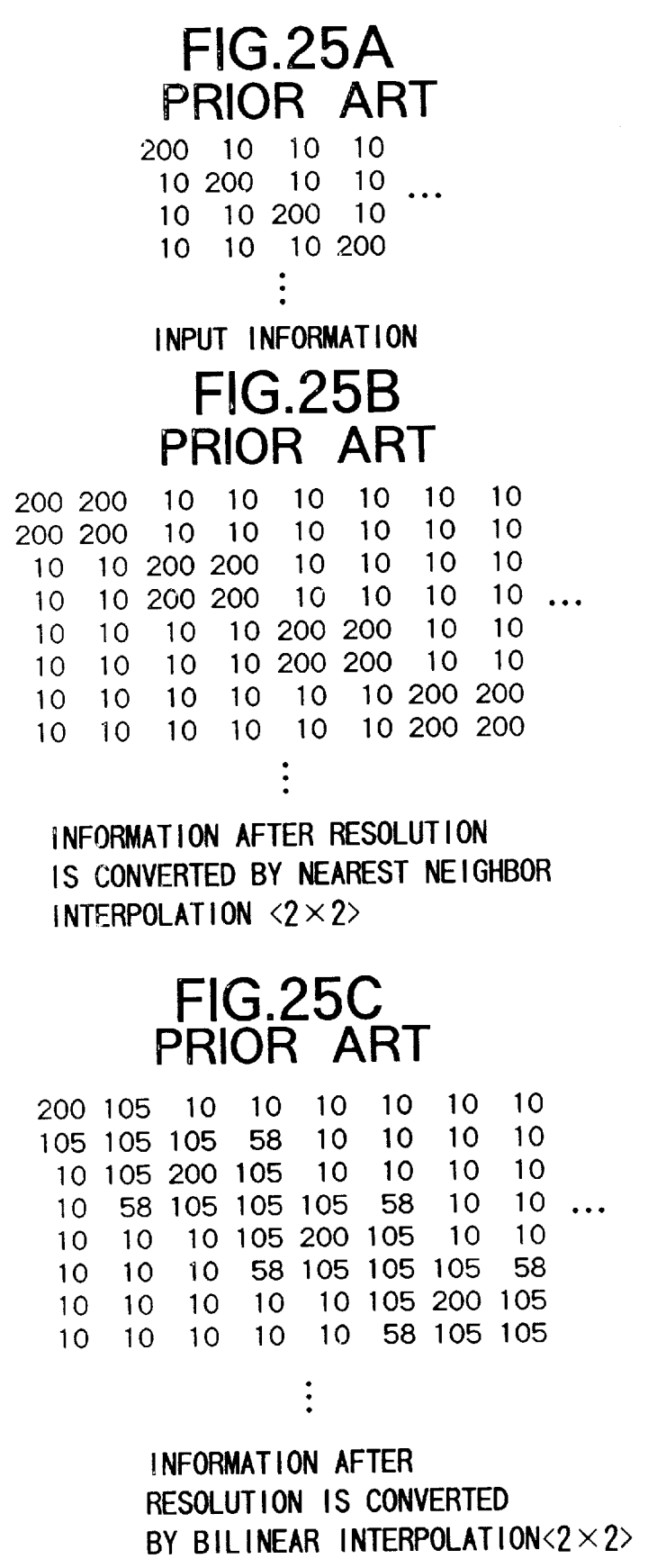

FIG. 25C shows image information obtained by interpolation by which the input image information shown in FIG. 25A is doubled in both the row and column directions by the method shown in FIG. 24.

As is apparent from FIG. 25C, the pixel values of not only portions around an oblique line but also the oblique line itself are made nonuniform, and this blurs the image.

Accordingly, a number of techniques of resolution conversion for high image quality have been proposed. For example, U.S. Pat. No. 5,280,546 has disclosed an interpolation method in which in order to remove an interpolation blur, a natural image and a line image are separated, linear interpolation is performed for the natural image, and binary linear interpolation is performed for the line image, thereby arranging the maximum and minimum values of nearest neighbor pixels. In this technique, however, an interpolation blur occurs in natural images. Also, jaggy is inevitably produced because high-resolution information is formed for line images while the resolution of low-resolution information remains unchanged. Additionally, even line images are quantized into two gradation levels. Therefore, although no problem arises when original information has only two gradation levels, the quality of a multi-gradation line image inevitably deteriorates because the number of gradation levels is decreased.

U.S. Pat. No. 5,430,811 has disclosed a nonlinear interpolation technique using an LUT. In this technique, however, the algorithm itself can handle only a magnification of 2× in both the horizontal and vertical directions. To increase the magnification, therefore, it is necessary to repeat the processing or combine the processing with another enlarging processing, resulting in complicated processing. In addition, even if a magnification raised to a power of 2 is realized in the repetitive processing, it is not easy to perform control so that each pixel of high-resolution information is given desired nonlinearity at the final magnification when the repetitive processing is taken into consideration. Also, in this technique the pixel values of an observed image (original information) are not changed. Therefore, the production of jaggy is inevitable as in U.S. Pat. No .5,280,546.

U.S. Pat. No. 5,054,100 has also disclosed nonlinear interpolation. This technique is effective for a simple interpolation blur having edges in the row and column directions. However, this effect of the technique cannot be obtained for even slightly complicated image information. Accordingly, jaggy is inevitably produced as in the two previous prior arts.

Furthermore, as resolution conversion of a binary image subjected to pseudo gradation processing such as the dither method or the error diffusion method, the use of techniques which realize high-quality resolution conversion by converting a pixel of interest and its vicinity into a multivalue image through a digital filter, performing linear interpolation, and again binarizing the image is known for long (e.g., U.S. Pat. No. 4,803,558 and Japanese Patent Publication No. 61-56665). Methods which use these techniques to perform high-quality resolution conversion when an original image is a multivalue image have been proposed. However, as long as the quantization technology such as binarization is used for edge formation, it is difficult to form high-quality multivalue images having spatial continuity of pixel values.

SUMMARY OF THE INVENTION

The present invention has been made to eliminate the drawbacks of the above conventional techniques and has as its object to provide an image processing apparatus and an image processing method in which when input low-resolution information is converted into high-resolution information, a blur which is particularly a problem in natural images is not produced by interpolation and no jaggy is produced regardless of the low resolution of the input original image, thereby realizing a conversion process with high image quality, and, when the high-resolution information is formed, the process is not divided unlike conventional threshold processing, so a continuous natural clear image can be formed extremely easily even from a natural image.

It is another object of the present invention to provide an image processing apparatus and an image processing method capable of easily forming from a color image a high-resolution color image free from color misregistration.

To achieve the above objects, the present invention provides an image processing apparatus for converting low-resolution information into high-resolution information to increase the number of pixels of input image information, comprising first window forming means for forming a first window for referring to nearest neighbor pixels of a low-resolution pixel of interest, detecting means for detecting a plurality of representative values from the first window, converting means for converting a value of the pixel of interest by an adaptive low-pass filter (LPF), second window forming means for forming a second window for referring to converted values of the nearest neighbor pixels including the pixel of interest, linear interpolating means for performing linear interpolation on the basis of pixel value information in the first window or converted value information in the second window, and nonlinear interpolating means for performing nonlinear interpolation by a product-sum operation of linearly interpolated values from the linear interpolating means and the representative values.

Also, the present invention provides an image processing apparatus for converting color low-resolution information into high-resolution information to increase the number of pixels of input image information, comprising first window forming means for forming a first window for referring to nearest neighbor pixels of a low-resolution pixel of interest for each color component, detecting means for detecting a plurality of representative values from the first window for each color component, converting means for converting a value of the pixel of interest for each color component by an adaptive low-pass filter (LPF) on the basis of information of a plurality of color components in the first window, second window forming means for forming a second window for referring to converted values of the nearest neighbor pixels including the pixel of interest for each color component, linear interpolating means for performing linear interpolation on the basis of pixel value information in the first window or converted value information in the second window for each color component, and nonlinear interpolating means for performing nonlinear interpolation by a product-sum operation of linearly interpolated values from the linear interpolating means and the representative values for each color component.

Furthermore, the present invention provides an image processing method of converting low-resolution information into high-resolution information to increase the number of pixels of input image information, comprising the first window formation step of forming a first window for referring to nearest neighbor pixels of a low-resolution pixel of interest, the detection step of detecting a plurality of representative values from the first window, the conversion step of converting a value of the pixel of interest by an adaptive low-pass filter (LPF), the second window formation step of forming a second window for referring to converted values of the nearest neighbor pixels including the pixel of interest, the linear interpolation step of performing linear interpolation on the basis of pixel value information in the first window or converted value information in the second window, and the nonlinear interpolation step of performing nonlinear interpolation by a product-sum operation of linearly interpolated values from the linear interpolation step and the representative values.

It is still another object of the present invention to provide an image processing apparatus, an image processing method, and a storage medium capable of generating high-quality color image data having higher resolution than that of input color image data by preventing color misregistration or generation of extraordinary colors.

To achieve the above object, an image processing apparatus of the present invention has the following arrangement.

That is, an image processing apparatus for inputting color image data and generating color image data having higher resolution than resolution of the input color image data, comprises selecting means for selecting representative colors from a processing unit block constituted by a pixel of interest and nearest neighbor pixels thereof in the input color image data, the number of representative colors being less than the number of pixels constituting the processing unit block and at least two, interpolating means for interpolating the pixel of interest on the basis of the input color image data in the processing unit block to generate a plurality of interpolated pixel data, and calculating means for calculating a color component i of output pixel data on the basis of the color component i of the interpolated pixel data and the color component i of the representative colors selected by the selecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing a window formed by a first window forming unit;

FIG. 3 is a view showing an example of a smoothing filter (LPF);

FIG. 4 is a view showing a window formed by a second window forming unit;

FIG. 7 is a view showing the arrangement of a converting unit shown in FIG. 1;

FIG. 8 is a view showing the arrangement of a linear converter shown in FIG. 7;

FIGS. 9A and 9B are views showing an example of image information and an example of quantized image information;

FIG. 10 is a view showing examples of multiplication coefficients according to quantization patterns;

FIG. 21 is a view showing examples of the selection of processes and the setting of coefficients in FIG. 12;

FIG. 22 is a view showing examples of the selection of processes and the setting of coefficients in FIG. 20;

FIGS. 25A, 25B, and 25C are views showing an example of input information and examples of processing performed by the methods shown in FIGS. 23 and 24;

DETAILED DESCRIPTION OF THE PREFERRED EMBODIMENTS

Figure 1:
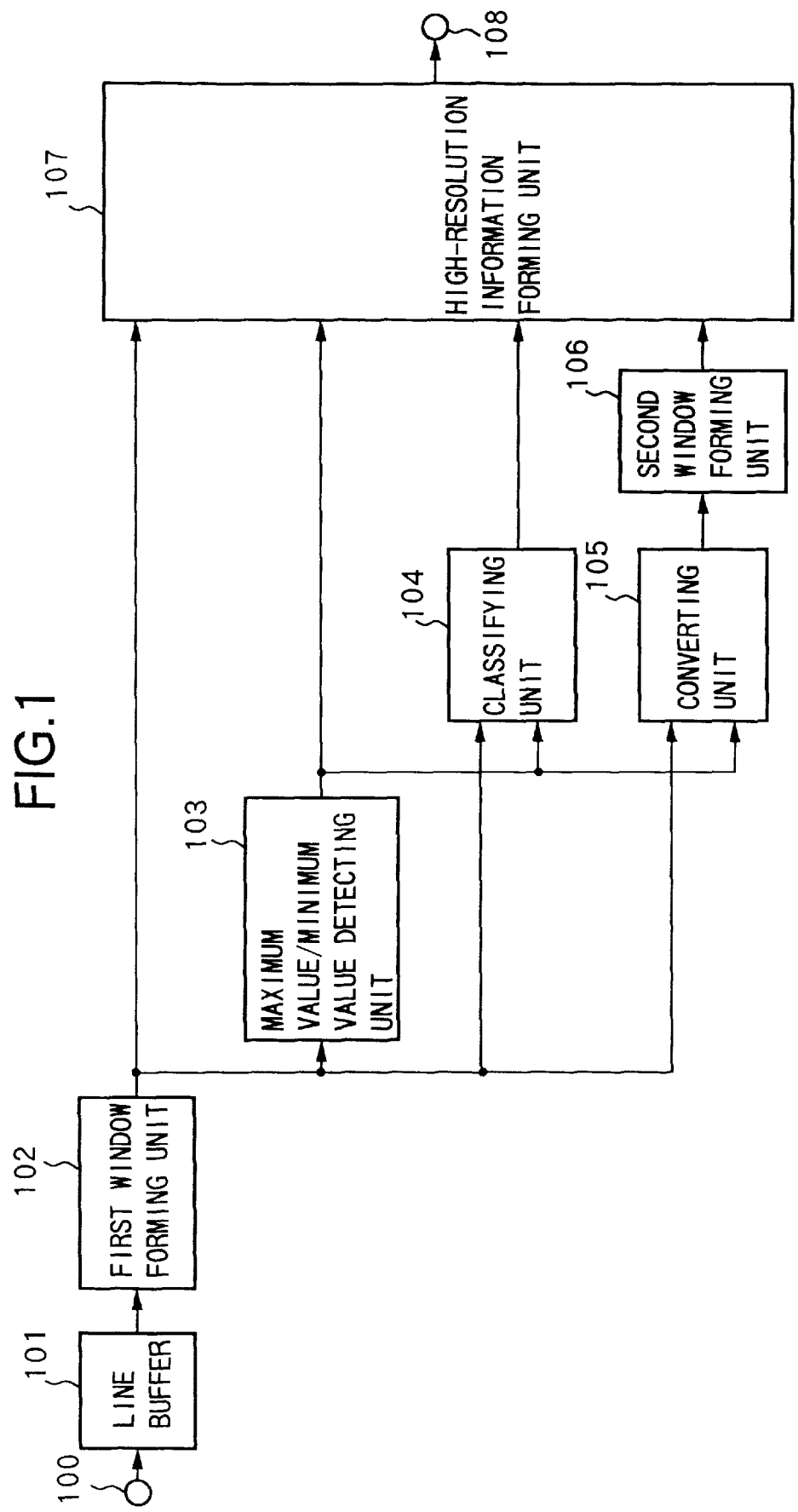
FIG. 1 is a block diagram showing the arrangement of the first embodiment of the present invention.

FIG. 1 is a block diagram showing an image processing apparatus of the first embodiment according to the present invention. The image processing apparatus of the present invention is efficiently incorporated into an image output apparatus such as a printer connected to a computer or a video printer to which video signals are applied. However, it is also possible to incorporate the image processing apparatus of the present invention as an image processing apparatus other than an image output apparatus, application software in a host computer, or printer driver software for outputting data to a printer.

The operation procedure of this embodiment will be described below with reference to the block diagram in FIG. 1. In this embodiment, input image information is converted into information having Nx and Mx pixels in the column and row directions.

In FIG. 1, reference numeral 100 denotes an input terminal for inputting low-resolution n-bit/pixel (n>1) information. Several lines of this low-resolution information are stored and held by a line buffer 101. On the basis of the image information of these several lines, a window containing a pixel of interest and its nearest neighbor pixels is set (a first window forming unit 102). This window is generally a rectangle having the pixel of interest in its center, but a shape other than a rectangle is naturally also possible. Assume that the window size of the rectangle is 5×5-pixels as shown in FIG. 2.

A maximum value/minimum value detecting unit 103 detects the maximum value (MAX5) and the minimum value (MIN5) of the twenty-five pixels in the 5×5 pixel block of the first window, and also detects the maximum value (MAX3) and the minimum value (MIN3) in the 3×3 pixels centered around the pixel of interest.

A classifying unit 104 evaluates the distribution of pixel values from the image information in the window and determines the image type of pixel of interest. In this embodiment, the classifying unit 104 classifies the pixel of interest by checking whether the pixel of interest has the characteristics of a natural image, the characteristics of an image such as a CG (Computer Graphics) image, or the characteristics of an image previously subjected to pseudo gradation processing of one to a few bits, i.e., checking a plurality of different image attributes, and outputs the classification result. The method of classification will be described later.

A converting unit 105 is a means for converting the pixel value of the pixel of interest by filtering. This converting unit 105 has the characteristics of an LPF (Low-Pass Filter) and removes high-frequency components depending upon the input resolution. FIG. 3 shows a representative smoothing filter. The filter shown in FIG. 3 calculates the average value of nine pixels, i.e., the pixel of interest and its nearest neighbor pixels. If all pixels are filtered, important high-frequency components, e.g., corners and thin lines are also removed. Therefore, it is necessary to adaptively switch on and off the filter. In this embodiment, to reduce the number of times of a product-sum operation and increase the processing speed, the operation is simplified to increase the speed of calculations of converted values. This converting unit 105 will also be described later.

A second window forming unit 106 is a means for setting a window for the converted pixel values independently of the first window forming unit 102. Assume that the window size of the second window forming unit 106 is 3×3 pixels centered around the pixel position of M' as the pixel of interest (FIG. 4).

Referring to FIG. 4, G', H', I', L', M', N', Q', R', and S' indicate the converted values of G, H, I, L, M, N, Q, R, and S, respectively. To calculate G', H', I', L', M', N', Q', R', and S' other than M' as the pixel of interest, at least the first window (FIG. 2) of 5×5 pixels is necessary. However, when the processing for the pixel of interest M is complete and the position moves to N as the next pixel of interest, the values of H', I', M', N', R', and S' can be reused if the converted values formed when M is processed are stored. Analogously, the values of J' and O' are calculated when I, which is already completely processed, is the pixel of interest. If the calculated converted values are stored, therefore, a converted value to be newly calculated when N is the pixel of interest is only the converted value T' in the pixel position of T, resulting in very efficient processing.

A high-resolution information forming unit 107 forms image information of N×M pixels corresponding to the pixel of interest on the basis of the information (first window information) in the window of the original information, the information (second window information) in the window of the converted values, the information of the maximum value (MAX5 or MAX3) and the minimum value (MIN5 or MIN3) in the first window, and the classification result of the pixel of interest. The formed image information is output from an output terminal 108 to, e.g., a printer engine.

Figure 5:
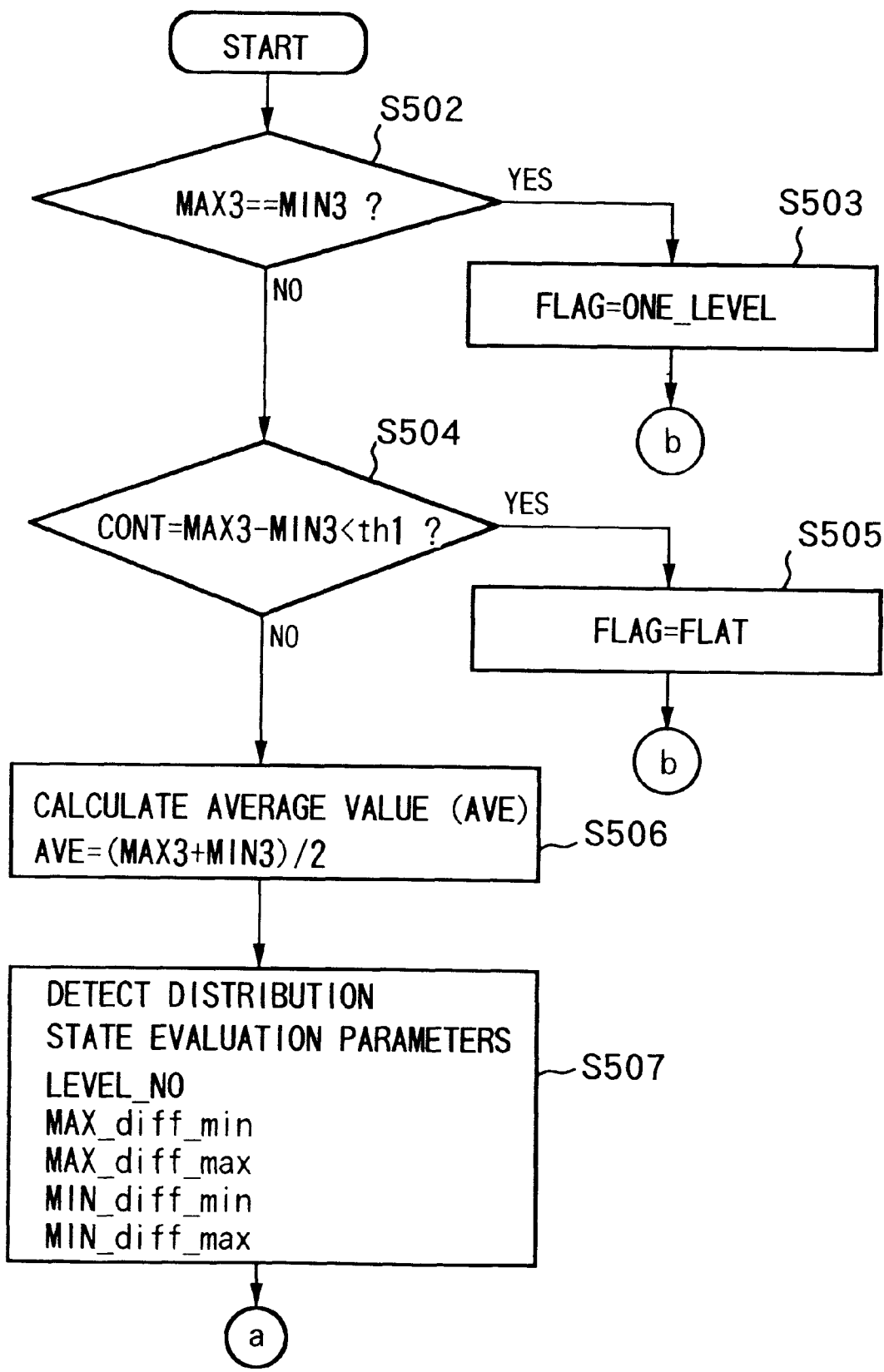
FIG. 5 is a flow chart for explaining the processing of a classifying unit shown in FIG. 1.
Figure 6:
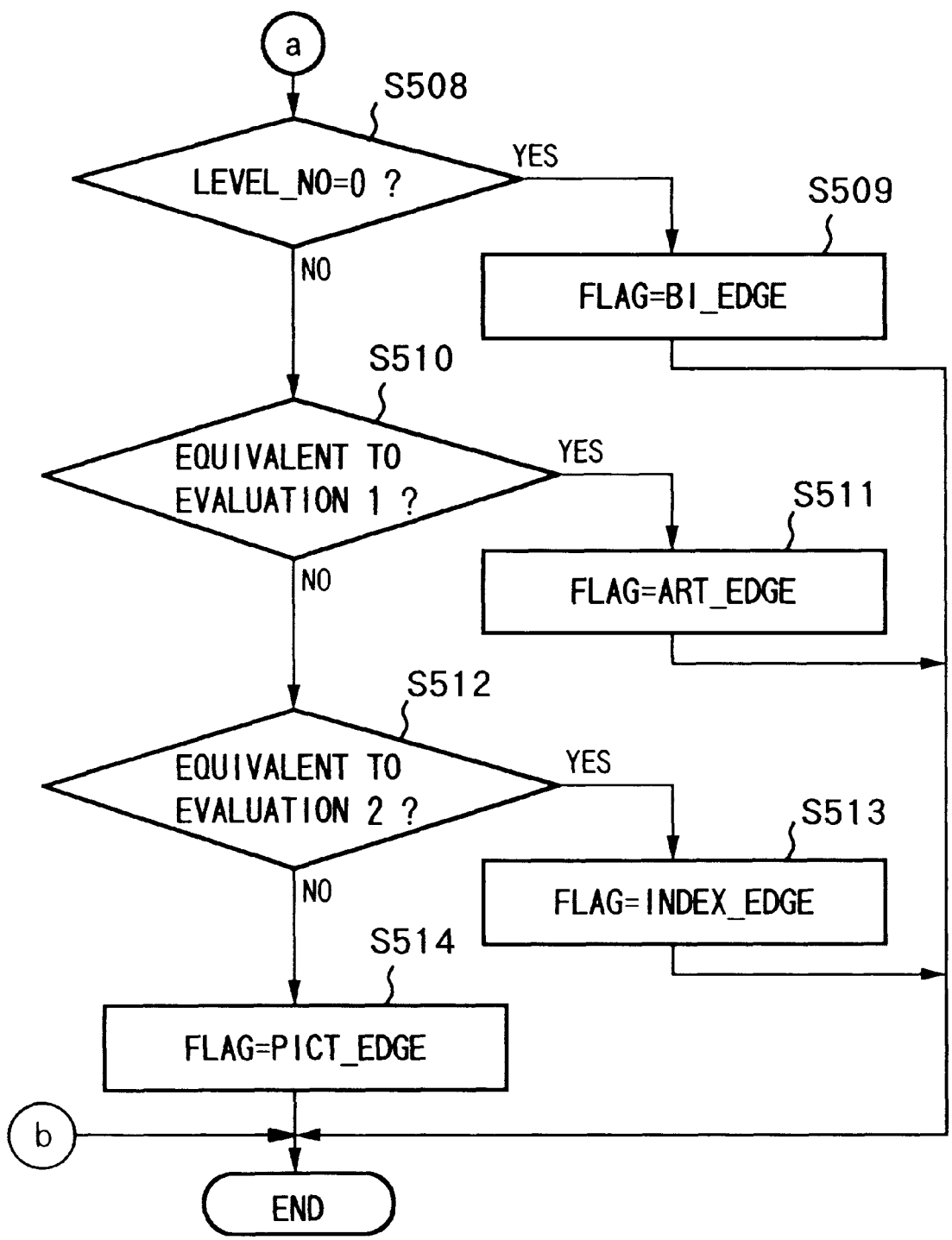
FIG. 6 is a flow chart for explaining the processing of the classifying unit shown in FIG. 1.

Details of the classifying unit 104 will be described next. FIGS. 5 and 6 are flow charts for explaining the processing of the classifying unit. Assume that only 3×3 pixels in the first window formed by the first window forming unit 102 are used in the determination of classification. In step S502, whether MAX3 and MIN3 are the same is checked. If MAX3 and MIN3 are the same, it is possible to determine that only one gradation level exists in the 3×3-pixel window. That is, if YES in step S502, it is determined in step S503 that the classification is FLAG=ONE_LEVEL. If NO in step S502, it is determined that a plurality of gradation levels exist, and whether the difference between MAX3 and MIN3 is larger than a preset threshold value (th1) is checked in step S504. If the difference is smaller than the threshold value, it is determined in step S505 that the image is a flat portion and the classification is FLAG=FLAT. If the difference is equal to or larger than the threshold value, an average value AVE of MAX3 and MIN3 is calculated in step S506. After the three values MAX3, MIN3, and AVE are calculated, the flow advances to step S507 to again scan the 3×3-pixel window, thereby calculating the following five distribution state evaluation parameters.

LEVEL_NO
MAX_diff_min
MAX_diff_max
MIN_diff_min
MIN_diff_max

LEVEL_NO is a parameter representing the number of gradation levels in the window, but no accurate gradation number information is necessary. If the formation of a histogram of pixel values in the window is difficult because, e.g., the processing is time-consuming, it is only necessary to be able to check whether the number of gradation levels is 2 (only MAX3 and MIN3, LEVEL_NO=0) or 3 or more (LEVEL_NO=1).

MAX_diff_min represents the difference between a value (A) equal to or larger than AVE and except for MAX3 and closest to MAX3. Similarly, MAX_diff_max represents the difference between a value (B) equal to or larger than AVE and except for MAX3 and farthest from MAX3. If there is no value larger than AVE and except for MAX3, it is only necessary to set these parameters to be able to be discriminated in the later determination, e.g., set MAX_diff_min=MAX_diff_max=0.

MIN_diff_min represents the difference between a value (C) smaller than AVE and except for MIN3 and closest to MIN3. Similarly, MIN_diff_max represents the difference between a value (D) smaller than AVE and except for MIN3 and farthest from MIN3. If there is no value smaller than AVE and except for MIN3, it is only necessary to set these parameters to be able to be discriminated in the later determination, e.g., set MIN_diff_min=MIN_diff_max=0.

On the basis of the above five different values, the characteristics of the image in the window are checked, and the attribute of the image is classified.

In step S508 of FIG. 6, whether LEVEL_NO is 0, i.e., whether the window has two gradation levels or three or more gradation levels is checked. If YES in step S508, it is determined that the image is an edge portion having only two gradation levels. Therefore, it is determined in step S509 that the classification is FLAG=BI_EDGE. Subsequently, the following evaluation is performed in step S510.

That is, diff is calculated by $$diff=CONT-(MAX\_diff\_max+MIN\_diff\_max),$$

and whether diff satisfies either of conditions 1 and 2 below is checked.

Condition 1. diff>th2 AND MAX_diff_max<th3 AND MIN_diff_max<th3

Condition 2. diff>th4 AND MAX_diff_min>th5 AND MIN_diff_min>th5

Condition 1 OR Condition 2? (th2, th3, th4, and th5 are preset threshold values) . . . evaluation (1)

If YES in step S510, it is determined that the image shows the characteristics of an artificially formed edge. Therefore, it is determined in step S511 that the classification is FLAG=ART_EDGE.

If NO in step S510, the following evaluation is performed in step S512.

MAX_diff_min>th6 AND MIN_diff_min>th6

(th6 is a preset threshold value) . . . evaluation (2)
(Note that th2>th4>th6 is preferable)

If YES in step S512, the input image may be image information previously subjected to pseudo gradation processing. Therefore, it is determined in step S513 that the classification is FLAG=INDEX_EDGE. If NO in step S512, the characteristics of the image are close to the characteristics of an edge of a natural image. Therefore, it is determined in step S514 that the classification is FLAG=PICT_EDGE. In evaluations (1) and (2), the discreteness of pixel values in the window is evaluated.

Evaluation 1 indicates a so-called "valley" distribution (condition 1 of (1)) having no intermediate values, in which pixel values locally exist near MAX3 or MIN3 and no intermediate pixel values exist, or a discrete distribution (condition 2 of (1)) which is entirely evenly quantized from MAX3 to MIN3. Therefore, it is determined that the image is an artificially formed image.

Evaluation 2 indicates a "sparse" distribution in which although no such significant artificiality as in evaluation 1 is found, both of values close to MAX3 and MIN3 are discrete rather than continuous. Accordingly, it is determined that the image is image information which is originally a natural image and previously quantized into a few bits in order to, e.g., compress before being input to the image processing apparatus of this embodiment via a transmission path. On the internet which is rapidly becoming prevalent recent years, image information having a few bits of pseudo gradation is often circulated regardless of whether the image information is an artificial image or a natural image. The edge of a natural image such as a photograph input from a capture means having a number of gradation levels, e.g., an image scanner or a digital camera, hardly forms a distribution having a more or less discrete tendency as described above due to, e.g., bluntness of MTF upon image input. That is, continuity is always found in a portion of the distribution.

The foregoing is an example of the classifying unit. The classifying unit of this embodiment classifies an image into six different types, ONE_LEVEL, FLAT, BI_EDGE, ART_EDGE, INDEX_EDGE, and PICT_EDGE. It is naturally possible to classify an image into a larger or smaller number of types.

Also, 5×5-pixel information can be used instead of 3×3-pixel information, and the information of MAX5 and MIN5 can be used in combination with the information of MAX3 and MIN3 in the evaluations. The number of evaluation parameters can naturally be larger or smaller than that of this embodiment.

The calculations of converted values will be described in detail below. FIG. 7 shows an example of the converting unit 105. As described previously, the converting unit 105 functions as an LPF for removing the resolution dependence of input resolution. Therefore, adaptive digital filtering can be used depending on the type of system to be built. A portion enclosed with the dotted lines is the converting unit.

Referring to FIG. 7, a quantizer 602 is a means for quantizing each pixel in the window on the basis of the values of MAX3 and MIN3. In this embodiment, each pixel value in the window is simply binarized by setting AVE as a threshold value as follows.

$$AVE=(MAX3+MIN3)/2 \quad (3)$$

The calculation of AVE can naturally be the same as used in the classifying unit 104 described above.

Reference numeral 603 denotes an LUT (Look-Up Table) which receives the quantized information in the window and outputs values stored in the table. The table stores the relative mixing ratios of MAX3 to MIN3 with respect to quantization patterns. On the basis of this mixing ratio, a linear converter 604 performs linear conversion by a product-sum operation. The linearly converted value is output as a converted value (F(p,q)).

FIG. 8 is a view showing the internal arrangement of the linear converter 604. A block enclosed with the dotted lines indicates the linear converter 604. Assume that an input signal has n-bit depth information. Information input to the linear converter includes three different values, i.e., MAX3, MIN3, and an output value α from the LUT. Let the bit length of α be m bits. A multiplier 701 calculates the product of α and MAX3, and a multiplier 702 calculates the product of (2^m−α) and MIN3 (2^m means the mth power of 2). An adder 703 adds these products, and a bit shift 704 performs bit shift processing for the resulting sum. This bit shift processing returns the bit length which is increased to (n×m) bits by the multiplications to the n-bit signal, i.e., shifts the bit length by m bits. It is preferable to experimentally set a value suited to the system configuration as the value of m.

If, however, the bit length of α is m bits, the values which α can take are from 0 to (2^m−1). In the arrangement shown in FIG. 8, therefore, the multiplication coefficient of MAX3 is 0 to (2^m−1), and the multiplication coefficient of MIN3 is 1 to (2^m). In order that the both multiplication coefficients be 0 to (2^m), it is possible to increase the bit length of α by one bit or slightly change the assignment of the coefficients to select usable (2^m)) coefficients from (2^m+1) coefficients from 0 to (2^m)). In either case, the multiplication coefficient is naturally made equal to the n bits as the bit length of input MAX3 and MIN3 in the processing by the bit shift 704.

That is, assuming that α is a coefficient from 0 to 1 after normalization, the linear converter 604 calculates the converted value F(p,q) as follows.

$$F(p,q)=\alpha MAX3+(1-\alpha)MIN3 \quad (4)$$

The calculations of converted values will be described below by taking actual processing as an example.

Figures 9A, 9B:
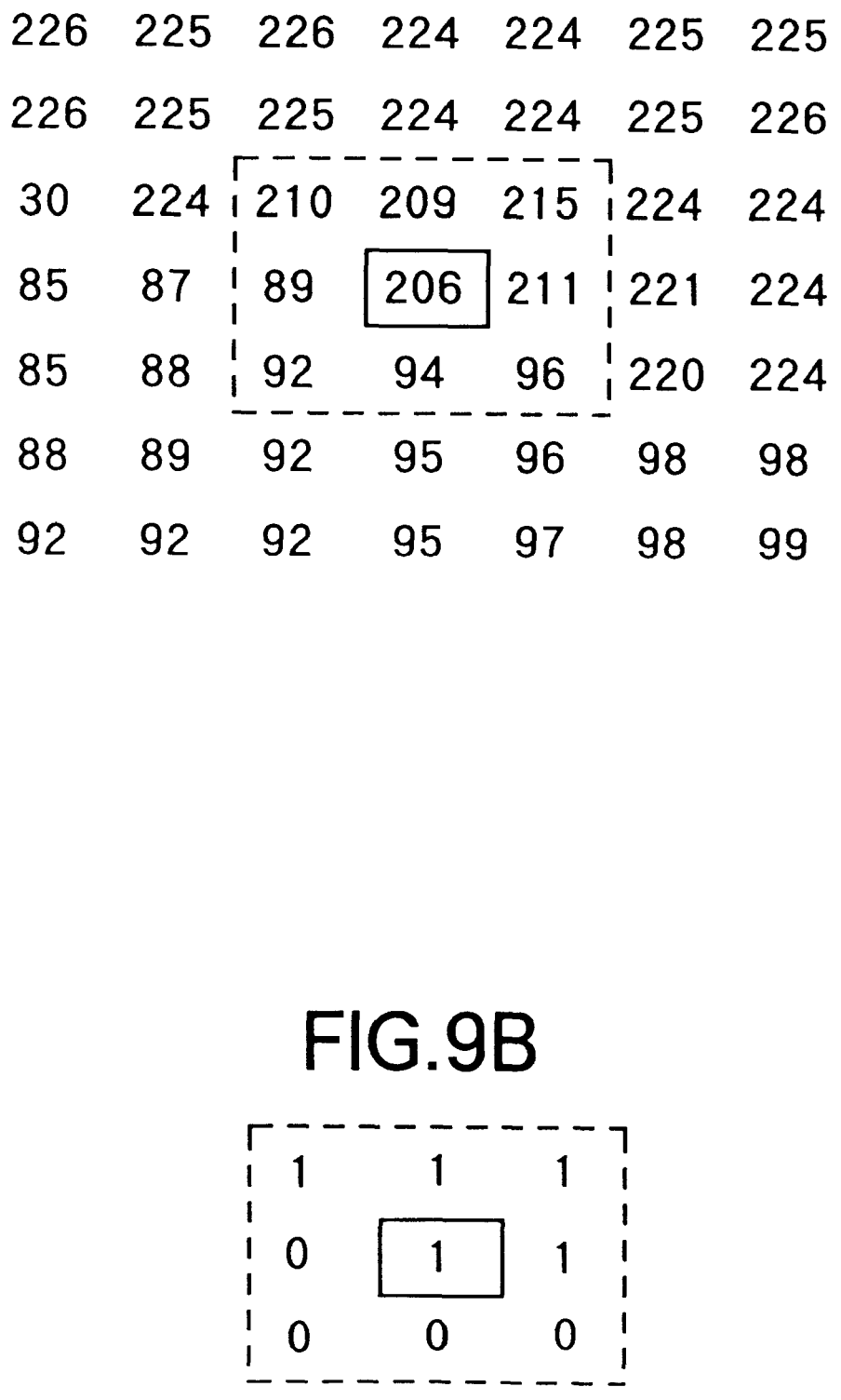

FIG. 9A shows input low-resolution information. Referring to FIG. 9A, a portion enclosed with the broken lines is a 3×3-pixel window for referring to nearest neighbor pixels, and a pixel positioned in a central portion enclosed with the solid lines is a pixel of interest. In FIG. 9A, MAX3=215, MIN3=92, and each pixel value is simply binarized by using AVE=153 based on equation (3) as a threshold value. FIG. 9B shows the result of binarization in the window.

FIG. 10 shows examples of the coefficient α (α is 8-bit information) stored in the LUT. As described above, α is the multiplication coefficient for MAX3 of the pixel of interest with respect to the binary pattern of nine pixels in the window. On the basis of this multiplication coefficient, the linear conversion product-sum operations of MAX3 and MIN3 are performed by using the configuration shown in FIG. 8. Since it is found from FIG. 10 that α=141 in the pattern shown in FIG. 9B, a converted value 160 is calculated by $$(215*144+92*115)/256=160$$

Figure 11:
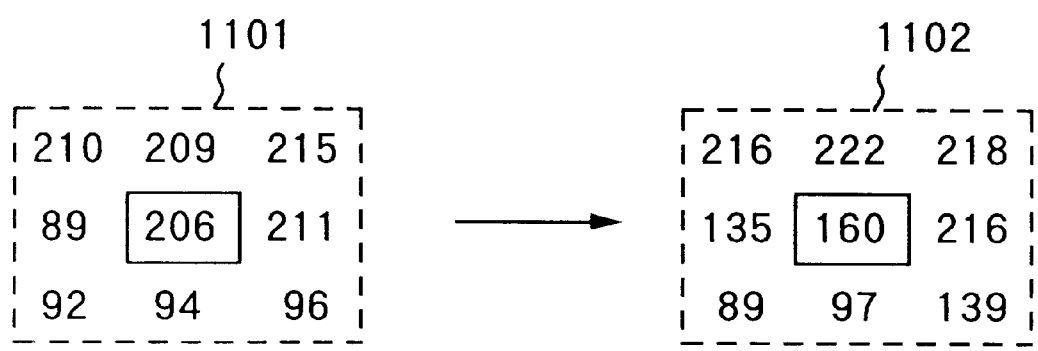
FIG. 11 is a view showing examples of conversion of pixel values in windows.

FIG. 11 shows examples obtained by similarly converting nearest neighbor pixels. Reference numeral 1101 denotes original information; and 1102, a converted value. It is apparent from 1102, the effect of an LPF is achieved by a small number of times of a product-sum operation. Also, the use of the LUT increases the degree of freedom compared to conventional digital filtering by which a plurality of different types of filters are adaptively switched.

The formation of high-resolution information will be described in detail below.

Figure 12:
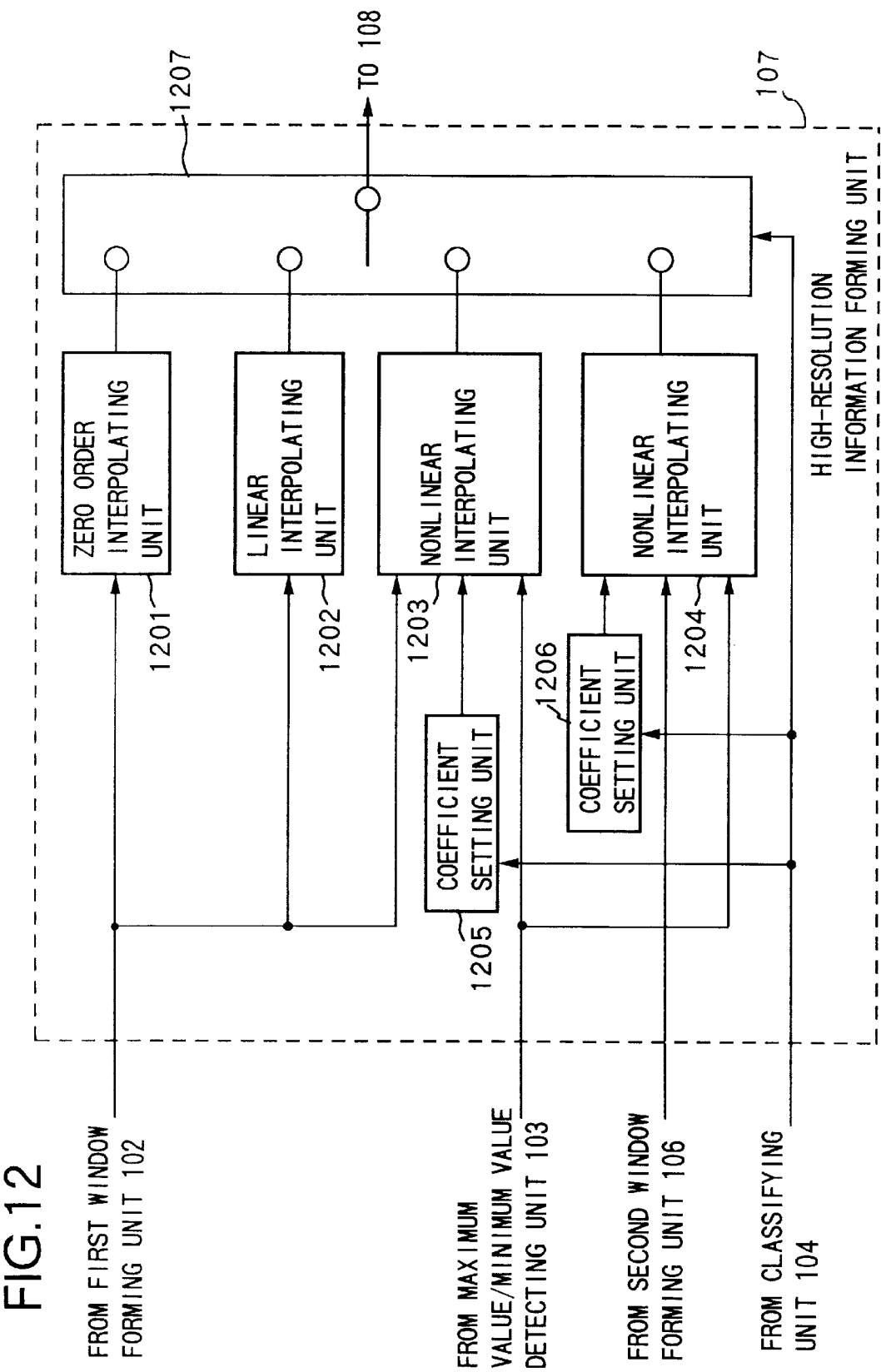
FIG. 12 is view showing the arrangement of a high-resolution information forming unit shown in FIG. 1.

FIG. 12 shows the arrangement of the high-resolution information forming unit 107. Referring to FIG. 12, a portion enclosed with the dotted lines is the high-resolution information forming unit 107. An input signal to the high-resolution information forming unit 107 includes the pixel value information in the window supplied from the first window forming unit 102, the maximum value/minimum value information (MAX3 and MIN3) in the window, the converted value information (FIG. 9) in the window supplied from the second window forming unit 106, and the identification information of the image type of pixel of interest supplied from the classifying unit 104. In FIG. 12, reference numeral 1201 denotes a zero order interpolating unit (equivalent to conventional nearest neighbor interpolation); 1202, a linear interpolating unit (equivalent to conventional bilinear interpolation); and 1203 and 1204, nonlinear interpolating units. The units 1203 and 1204 have the same arrangement except that the pixel value information in the window to be processed are different. Reference numerals 1205 and 1206 denote coefficient setting units for setting coefficients used in the nonlinear interpolating units in accordance with the information of the image type identified by the classifying unit. The nonlinear interpolating units 1203 and 1204 calculate interpolated values by the following operations including linear interpolation.

up[i][j]=(a*MAX3+b*inter_data[i][j])/(a+b)

down[i][j]=(a*MIN3+b*inter_data[i][j])/(a+b)

mid[i][j]=c*inter_data[i][j]+d*MAX3+d*MIN3+ e*MAX5+e*MIN5 i . . . 0 to N−1 j . . . 0 to M−1

On the basis of up[i][j], down[i][j], and mid[i][j] described above, (A) if mid[i][j]≧up[i][j], OUT[i][j]=up[i][j]

(B) if mid[i][j]≦down[i][j],

OUT[i][j]=down[i][j]

(C) in other cases,

OUT[i][j]=mid[i][j]  (5)

a, b, c, d, and e are coefficients inter_data[i][j] is an interpolated value of an interpolation point[i][j] obtained by linear interpolation OUT[i][j] is an output value of the interpolation point [i][j] from the nonlinear interpolating unit The linear interpolation arithmetic operation (calculation of inter_data[i][j]) used in the nonlinear interpolating unit can naturally be used in the linear interpolating unit 1202.

Figure 13:
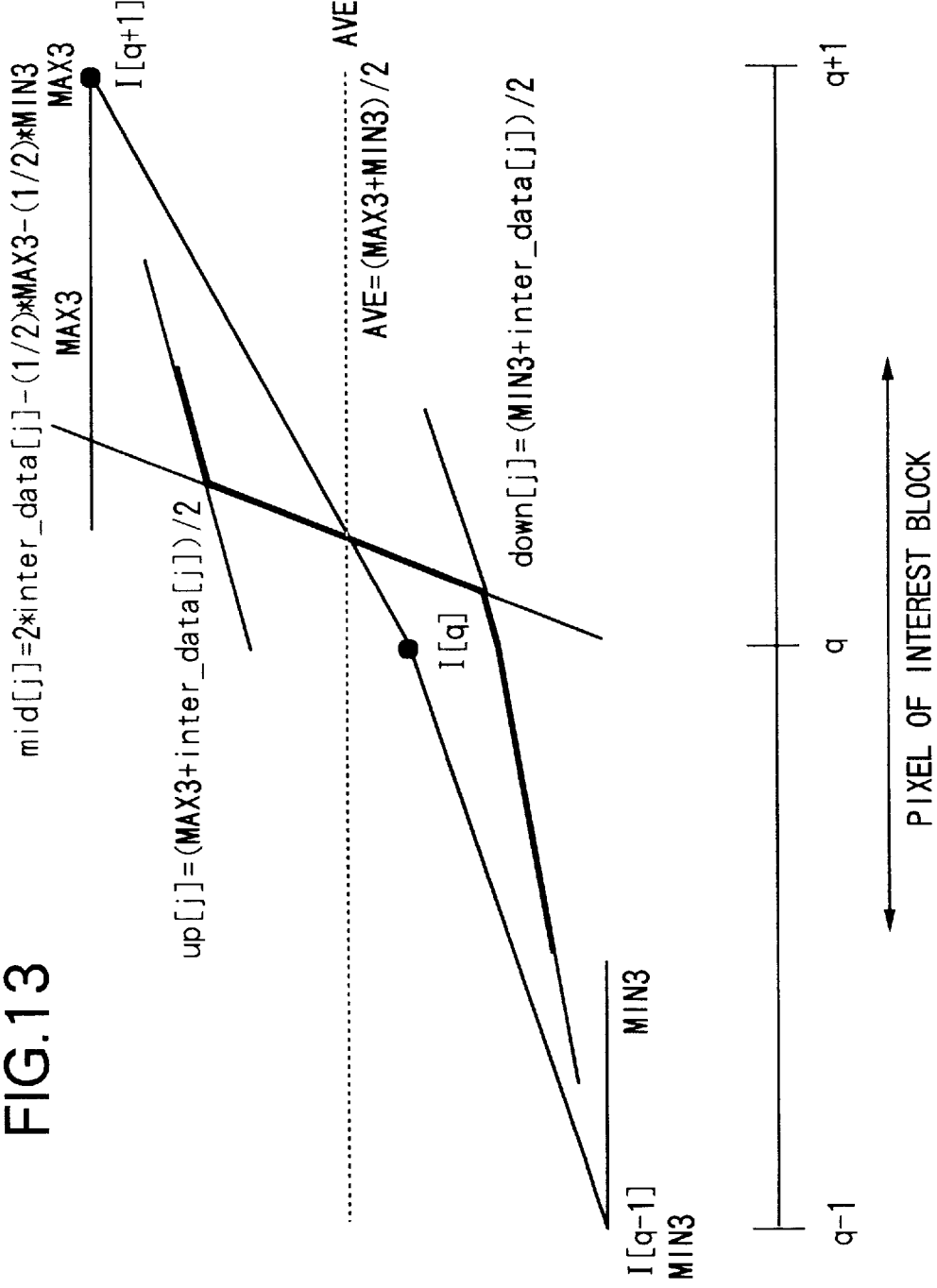
FIG. 13 is a view showing an example of the formation of high-resolution information.
Figure 14:
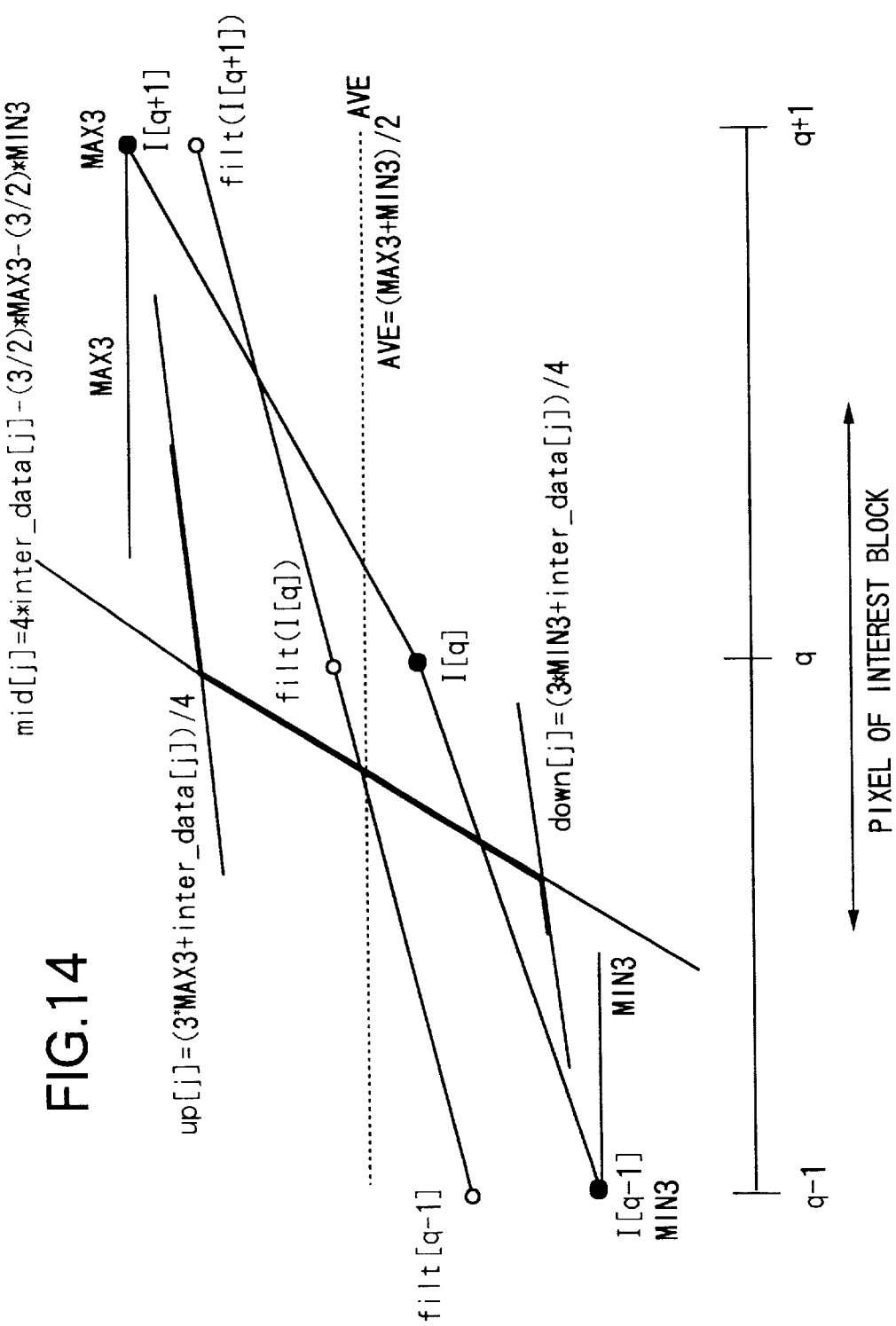
FIG. 14 is a view showing an example of the formation of high-resolution information.

FIGS. 13 and 14 show the loci of up, down, and mid described above in a one-dimensional analog manner in order to simplify the explanation. FIG. 13 shows an example using the pixel value information from the first window forming unit. In FIG. 13, the spatial coordinate is plotted on the abscissa, and the density is plotted on the ordinate. Assuming the pixel of interest is q, pixel values to be observed are I[q] indicated by closed dots (pixel values spatially before and after the pixel of interest are I[q−1] and I[q+1]). The range obtained when the pixel of interest is enlarged in illustrated as a pixel of interest block in an analog manner. From the size relationship between the three loci of up, down, and mid, a locus indicated by the thick line is an output of OUT. The coefficients used are a=1, b=1, c=2, d=−½, and e=0. As is evident from FIG. 13, nonlinear interpolation which makes the edge gradient steep can be realized.

FIG. 14 shows an example using the converted value information from the second window forming unit 106. In addition to the pixel values to be observed, points indicated by open dots represent pixel values after conversion using an adaptive LPF. For the sake of simplicity, however, pixels to be observed in the first window are also shown in FIG. 14 to indicate the relative positional relationship with the converted values. The high-resolution information formation using the second window is slightly different in edge position from that using the first window. This difference between the edge positions represents a great effect of reducing jaggy.

The coefficients used in FIG. 14 are a=3, b=1, c=4, d=−¾, and e=0.

In both FIGS. 13 and 14, it is assumed that I[q−1] is MIN3 and I[q+1] is MAX3 for the sake of simplicity. In any case, however, this embodiment can of course realize good nonlinear interpolation. Also, the individual coefficients must be so set that the continuity is maintained not only in each block but also between blocks.

In FIG. 12, reference numeral 1207 denotes a switch for selecting an optimum process from 1201 to 1204 in accordance with the identification signal from the classifying unit.

FIG. 21 shows the switching between processes and the setting of coefficients performed by the classifying unit 104 in the form of a table. These coefficients are merely examples, and, similar to the threshold values (th0 to th6) used in the classifying unit, it is only necessary to experimentally obtain coefficients best suited to an actual printing system. Also, the switching between processes is merely an example, and it is only necessary to experimentally obtain necessary image types and accompanying switching together with the types of classified images.

In this embodiment, the product-sum operations of the linear interpolating unit and the representative values in the window are described in the form of equation (5) to simplify the explanation. However, since the linear interpolation itself is a product-sum operation, these calculations can be described in the form of a single product-sum operation. That is, the linear interpolation is done by a product-sum operation for the pixel values of four points to be observed including the interpolation point. Therefore, if the four points MAX3, MIN3, MAX5, and MIN5 are used as the representative values in the window as described above, nonlinear interpolation can be performed by a product-sum operation for a total of eight points.

Figure 19:
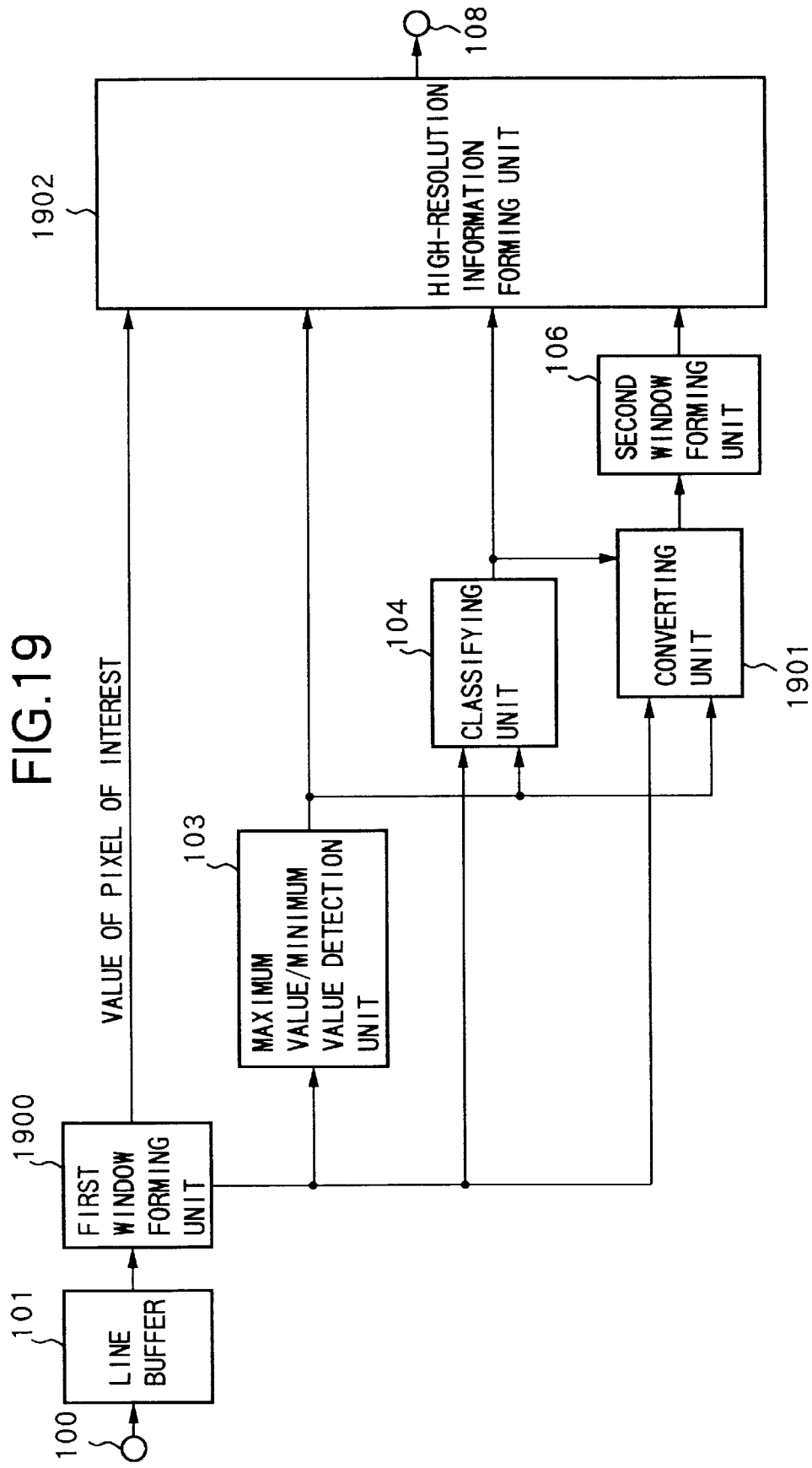
FIG. 19 is a block diagram showing the main parts of a modification of the first embodiment of the present invention.

FIG. 19 shows a modification of the arrangement shown in FIG. 1. The same reference numerals as in FIG. 1 denote the same parts in FIG. 19, and a detailed description thereof will be omitted. Referring to FIG. 19, a first window forming unit 1900 outputs pixel value information of 5×5 or twenty-five pixels centered around the pixel of interest as described above. The first window forming unit 1900 also outputs pixel value information of only the pixel of interest to a high-resolution information forming unit 1902. A converting unit 1901 performs conversion having the role of an adaptive LPF as in FIG. 1. The converting unit 1901 of this modification receives information from the classifying unit 104 and executes conversion by adding the classified attribute information. That is, the converting unit 105 shown in FIG. 1 calculates converted values only in 3×3-pixel patterns, whereas the converting unit 1901 changes its calculation method for each classification. For example, when the attribute of a classified pixel of interest is ONE_LEVEL, FLAT, INDEX_EDGE, or PICT_EDGE, the value of this pixel of interest can be directly used as a converted value. That is, assuming that the conversion is an adaptive LPF, this filter can be considered as a through filter. Since image information has a strong correlation between adjacent pixels, an attribute classified for each pixel of interest rarely changes. Even when classification is determined for each pixel of interest, the same determination result is often obtained in a certain small unit area. That is, the second window forming unit and the first window forming unit can be made equivalent to each other by using the converting unit as a through filter without transmitting the information of twenty-five or nine pixels in the window formed by the first window forming unit to the high-resolution information forming unit.

That is, windows can be combined into a single window by partially using a through filter.

The high-resolution information forming unit 1902 receives the pixel value information in the second window, the maximum value/minimum value information (MAX5, MIN5, MAX5, and MIN3), and the classified attribute information.

Figure 20:
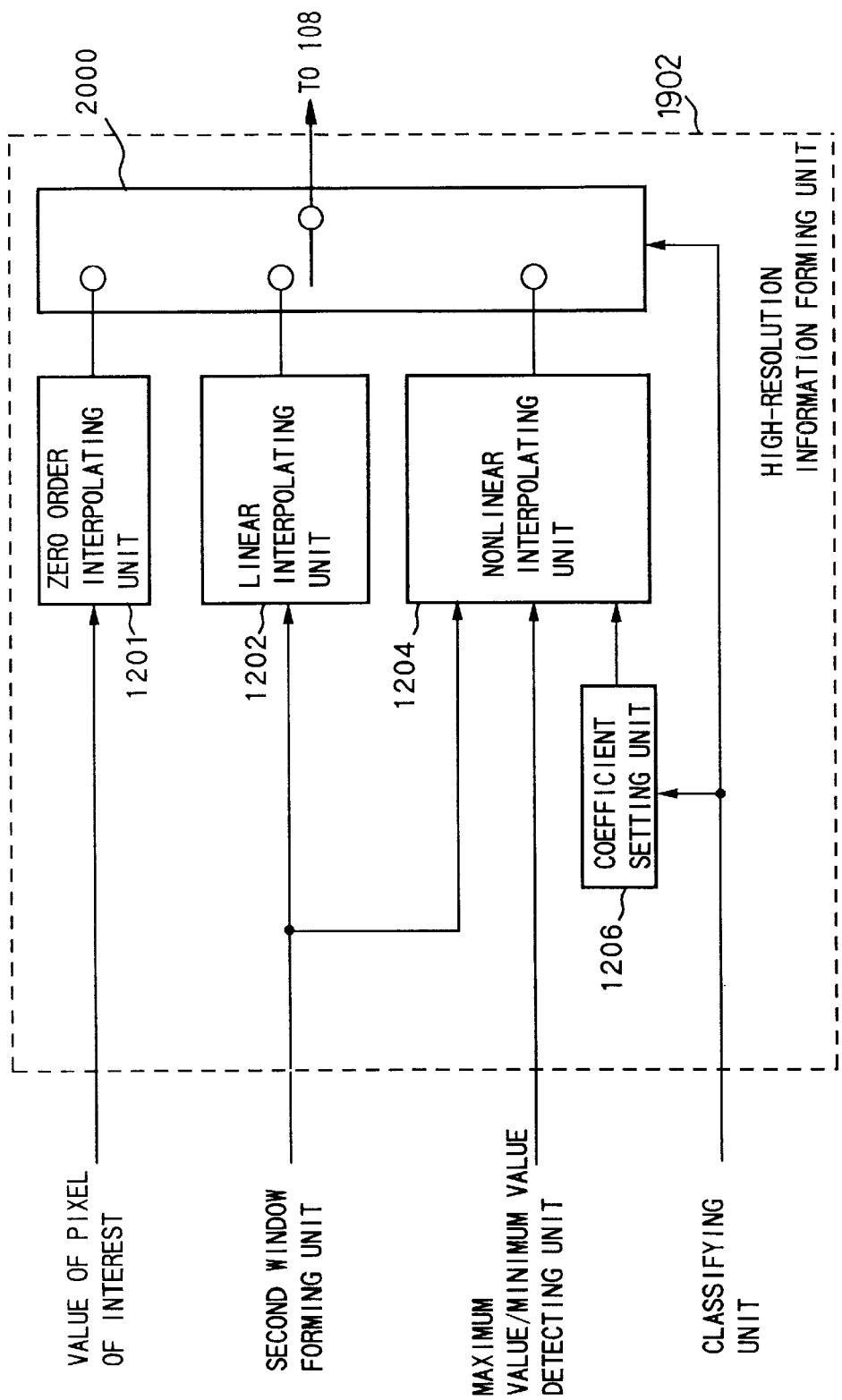
FIG. 20 is a view showing an example of a high-resolution information forming unit shown in FIG. 19.
Figure 23:
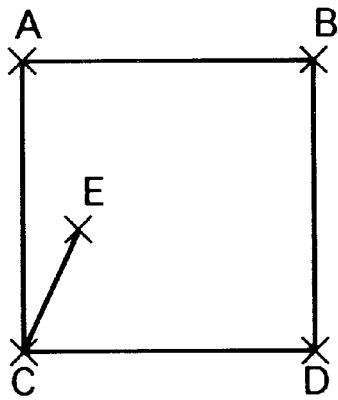
FIG. 23 is a view for explaining nearest neighbor interpolation as prior art.
Figure 24:
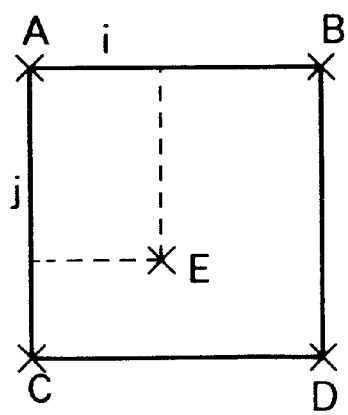
FIG. 24 is a view for explaining bilinear interpolation as prior art.

FIG. 20 shows the high-resolution information forming unit 1902. A portion enclosed with the dotted lines indicates the high-resolution information forming unit 1902. The same reference numerals as in FIG. 12 denote the same parts in FIG. 20. This high-resolution information forming unit 1902 comprises a zero order interpolating unit 1201, a linear interpolating unit 1202, and a nonlinear interpolating unit 1204. A switch 200 selects one of the interpolating units to be used. In this modification, only converted pixel value information is used. Therefore, the selection items of processes and the setting of coefficients are as shown in FIG. 22.

As described above, this embodiment is directed to effective combination of the "adaptive LPF" with the "nonlinear interpolation".

That is, to remove an input resolution depending part from input image information, adaptive smoothing for cutting off high-frequency components of the input resolution is necessary. However, when only passed low-frequency components are output, the result is a blurred image. Therefore, nonlinear interpolation which forms new high-frequency components meeting the output resolution is essential. Nonlinear properties can be produced by extracting representative pixel values (equivalent to the maximum and minimum values in this modification) from nearest neighbor pixels, and performing an adaptive product-sum operation of linear interpolation and the representative pixel values. In addition, the nonlinearity can be easily controlled by switching or optimizing the coefficients of the product-sum operation. It is also possible to dynamically and continuously change the coefficients on the basis of the contrast of an edge, instead of switching them step by step. The basic idea for CG and line images holds for natural images. In the case of a natural image, however, the quality of an output image is required to have "naturalness". Therefore, image information cannot be largely departed from input information. However, an interpolation blur occurs due to a reduction in high-frequency components if only linear interpolation is performed. To form new high-frequency components, therefore, nonlinear interpolation which performs an adaptive product-sum operation of linear interpolation and representative pixel values in nearest neighbor pixels is essential to improve the image quality.

When the processing of this embodiment is used, an image matching high output resolution can be formed regardless of the attribute of the image or the magnification of the processing. It is of course possible to switch various coefficients by using the magnification as an evaluation coefficient or by evaluating actual absolute output resolution (a numerical value represented by, e.g., dpi (dot per inch) or ppi (pixel per inch)).

<Second Embodiment>

Figure 15:
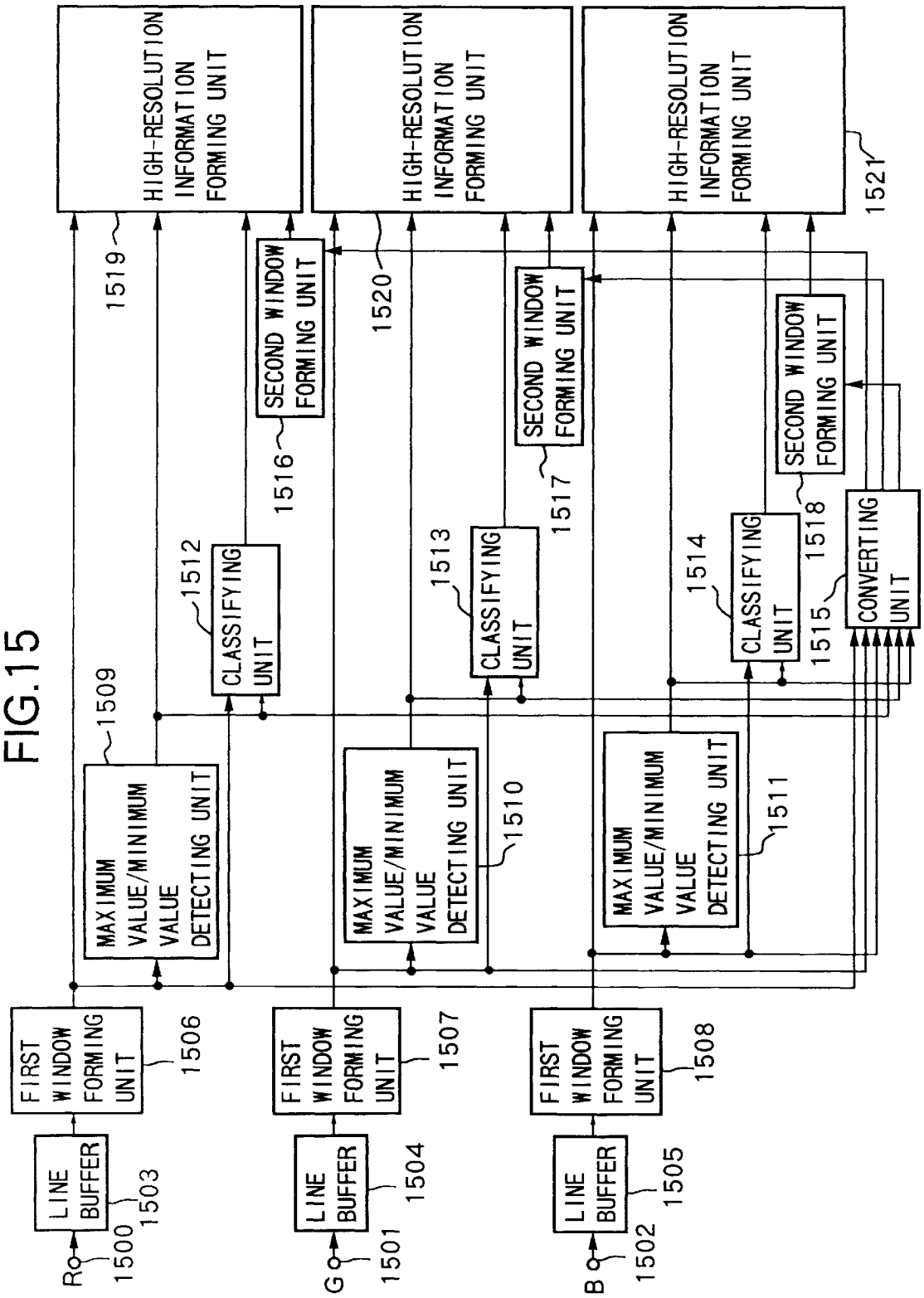
FIG. 15 is a block diagram showing the arrangement of the second embodiment of the present invention.

FIG. 15 is a block diagram of the second embodiment according to the present invention. In this second embodiment, resolution conversion of color images will be described. When a color image is input, a good output image can be formed by processing the input image for each color component (e.g., each of R, G, and B) by using the arrangement of the block diagram shown in FIG. 1. However, the extent to which jaggy is reduced differs from one color to another in a high-resolution information forming unit using nonlinear interpolation. This sometimes brings about color misregistration on the edge or the like and prevents improvement of the image quality. Also, on the internet which has rapidly become predominant in recent years, images given pseudo gradation by using pallets of a few bits are often used. When an image is given this pseudo gradation, misregistration of each color sometimes takes place on the edge of the image. From image information having this color misregistration before being input to an image processing apparatus of the second embodiment, a high-quality, high-resolution image information is difficult to form only by processing the input image by using the arrangement shown in FIG. 1 for each color.

The objects, therefore, of this second embodiment are to (1) prevent color misregistration in the image processing apparatus, and (2) correct an image originally having slight color misregistration by using the image processing apparatus, thereby forming high-resolution information better than in the arrangement shown in FIG. 1.

In FIG. 15, reference numerals 1500, 1501, and 1502 denote input terminals which input R, G, and B signals, respectively. Line buffers 1503, 1504, and 1505 store a few lines of image information of their respective color components. First window forming units 1506, 1507, and 1508 form windows shown in FIG. 2 for their several color components.

Maximum value/minimum value detecting units 1509, 1510, and 1511 detect the maximum and minimum values in 5×5 pixels and in 3×3 pixels, as in the arrangement shown in FIG. 1. Classifying units 1512, 1513, and 1514 classify the attribute of image type in the same manner as in the above first embodiment.

Reference numeral 1515 denotes a converting unit which is the characteristic feature of this second embodiment. This converting unit 1515 receives the pixel value information of each color component in the first window and the maximum value/minimum value information of each color component, and calculates a converted value of each color component.

Reference numerals 1516, 1517, and 1518 denote second window forming units each of which is a means for forming a window of the converted values of a pixel of interest and its nearest neighbor pixels of the corresponding color component. High-resolution information forming units 1519, 1520, and 1521 form high-resolution information matching the output resolution for their respective color components.

The only difference of the second embodiment from the arrangement shown in FIG. 1 is the converting unit 1515, so a description of the other blocks will be omitted.

Figure 16:
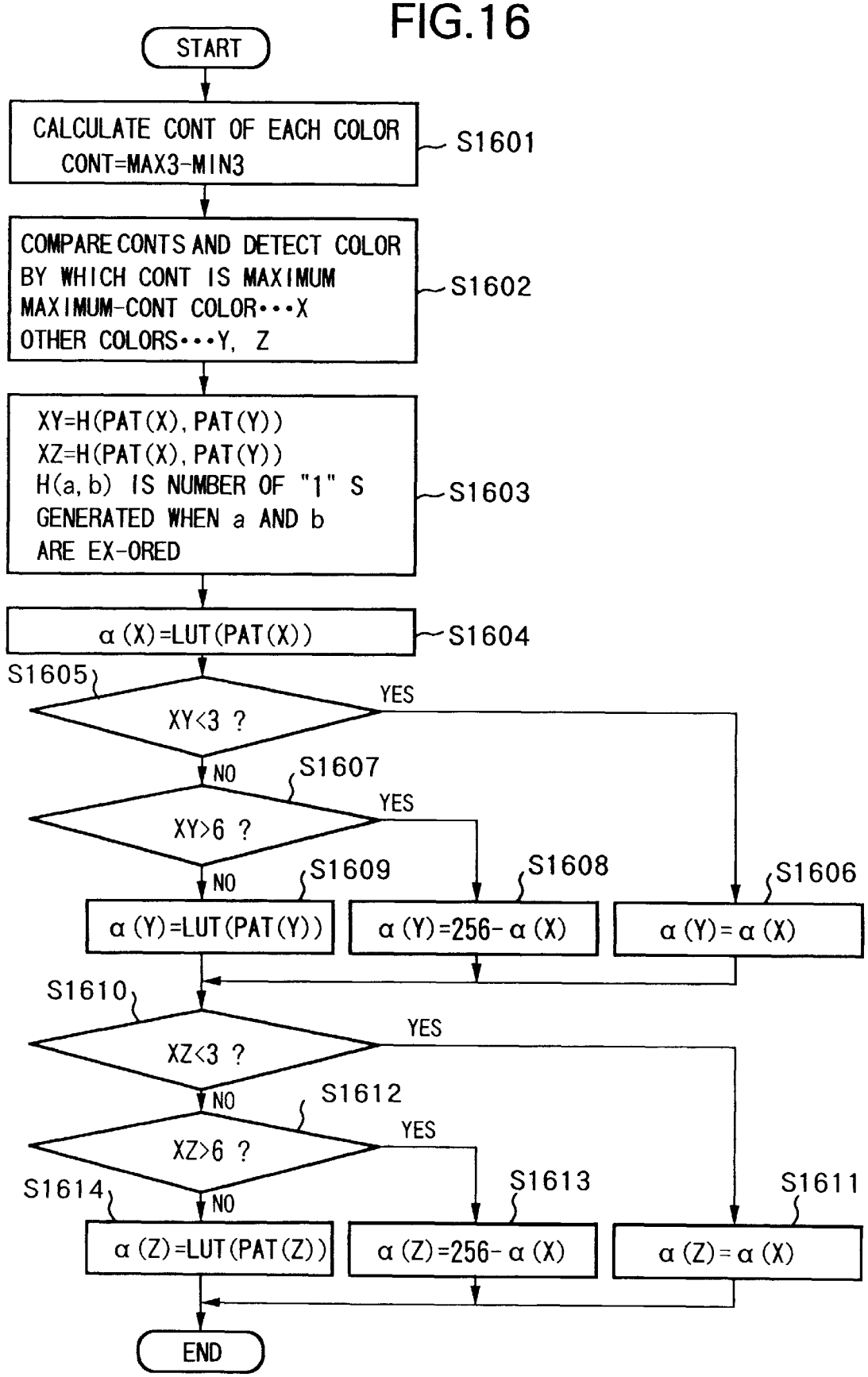
FIG. 16 is a flow chart for explaining the processing of a converting unit shown in FIG. 15.

FIG. 16 is a flow chart for explaining the processing performed by the converting unit 1515. The second embodiment is characterized in the method of calculating the product-sum coefficient $\alpha$ of MAX3 in the first embodiment described previously. The arrangement for calculating converted values by the product-sum operation of MAX3 and MIN3 based on equation (4) is the same as in the first embodiment. In step S1601, contrast (CONT) in 3×3 pixels is calculated for each color by the following equation.

$$CONT = MAX3 - MIN3 \qquad (6)$$

This calculation of CONT can naturally be the same as used in the classifying units.

Subsequently, in step S1602 the values of CONT of the individual colors are compared to detect a color having maximum CONT. That is, which of R, G, and B has the maximum contrast is detected. For the sake of simplicity, assume that a color having the maximum contrast is X and the other colors are Y and Z. For example, if the component G has the maximum contrast in 3×3 pixels, X=G, Y=R, and Z=B. The size relationship between Y and Z is ignored, so either of the colors not having the maximum contrast can be input to Y.

In step S1603, the following two conversions are calculated.

$$XY = H(PAT(X), PAT(Y))$$
$$XZ = H(PAT(X), PAT(Z)) \qquad (7)$$

Figure 17:
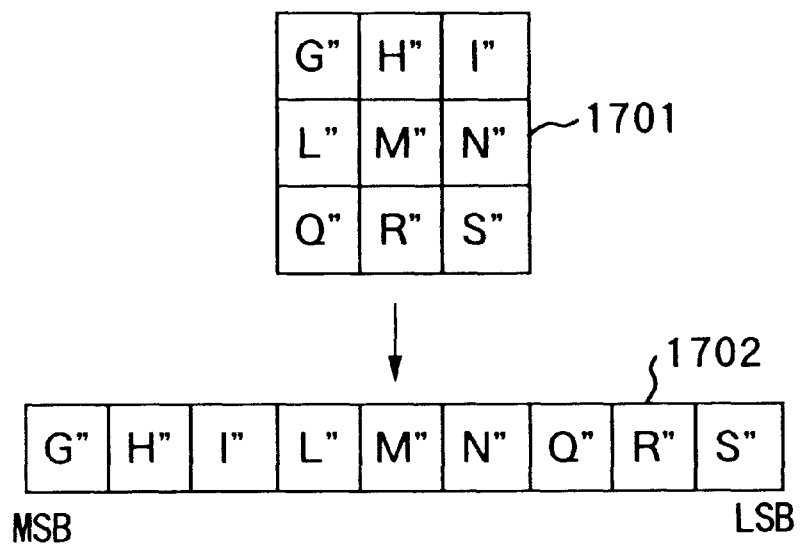
FIG. 17 is a view for explaining the conversion from a binary pattern into a 9-bit pattern.

PAT(X), PAT(Y), and PAT(Z) indicate quantized patterns of 3×3 pixels of the colors X, Y, and Z, respectively. That is, as in the arrangement shown in FIG. 7, quantization (binarization) is performed in nine pixels on the basis of AVE calculated by equation (4) for each color. Since each pixel after the binarization is expressed by one bit, the binary pattern of nine pixels can be expressed by 9-bit information. FIG. 17 shows the formation of this 9-bit information. Referring to FIG. 17, G", H", I", L", M", N", Q", R", and S" denoted by 1701 indicate the results of binarization of pixels G, H, I, L, M, N, Q, R, and S, respectively, by using AVE as a threshold value. These nine pixels are rearranged as indicated by 1702 to form 9-bit information.

H(a,b) in equation (7) is a function for EX-ORing a and b in units of bits and calculating the number of "1"s generated.

Figure 18:
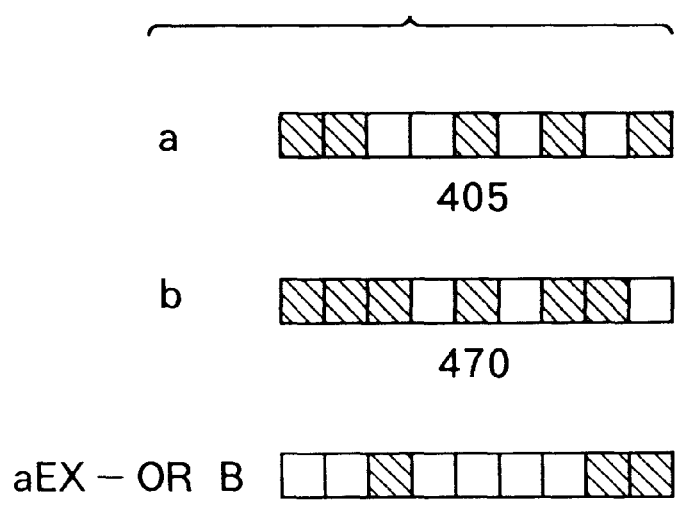
FIG. 18 is a view for explaining the calculation of H(a,b)

FIG. 18 shows an example. Reference numeral 1801 denotes a pattern of a="405"; 1802, a pattern of b="470"; and 1803, a pattern of aEX-ORb. In these 9-pixel patterns, black pixels represent "1", and the other pixels represent 0.

The function H( ) described above is equivalent to the number of "1"s in the nine pixels in aEX-ORb, so H(a,b)=3. That is, H( ) represents numerical values from 0 to 9.

After the values of XY and XZ are calculated by equation (6), a product-sum coefficient α(X) of the color X is calculated in step S1604. LUT(PAT(A)) indicates an output value from the LUT shown in FIG. 7 when the value of PAT(A) is input to the table. Next, whether the value of XY is smaller than 3 is checked in step S1605. If the value is smaller than 3, i.e., 0, 1, or 2, a product-sum coefficient α(Y) of the color Y is calculated in step S1606. If this is the case, the product-sum coefficient of the color Y is the same as the product-sum coefficient of the color X. If the value of XY is 3 or more, whether the value of XY is larger than 6 is checked in step S1607. If the value is larger than 6, i.e., 7, 8, or 9, the product-sum coefficient α(Y) of the color Y is calculated in step S1608. If this is the case, the product-sum coefficient of the color Y is calculated by subtracting α(X) from 256. That is, this value is the same as the product-sum coefficient of MIN3 of the color X. If XY is 3, 4, 5, or 6, the product-sum coefficient α(Y) is calculated in step S1609. This α(Y) is calculated by inputting the pattern PAT(Y) of the color Y to the LUT.

Steps S1610, S1611, S1612, S1613, and S1614 indicate a similar method of calculating a product-sum α(Z). Since this method is the same as the α(Y) calculation method described above, a description thereof will be omitted.

On the basis of the calculated product-sum coefficients α of the individual colors, converted values of these colors are calculated on the basis of equation (4) described earlier.

In the flow chart shown in FIG. 16, the approximateness (the degree of misregistration) of each color is easily evaluated by using the bit operation of EX-OR, and the misregistration is corrected on the basis of the evaluation result. When the approximateness is high, i.e., when the misregistration of a pattern is equal to or smaller than a certain threshold value (in the above example, when each of XY and XZ is 0, 1, 2, 7, 8, or 9), a color having the maximum contrast is given priority, and a product-sum coefficient matching this maximum-contrast color is used. That is, since the amount of misregistration is small, the misregistration before input is corrected by using the same product-sum coefficient for conversion of different colors. Also, when the same product-sum coefficient is used for different colors, the formation of high-resolution information performed by nonlinear interpolation can be so controlled as to produce little misregistration for each color. That is, the above-mentioned objects can be satisfied. On the other hand, when the approximateness is low, i.e., when the misregistration of a pattern is large, it is determined that the image is intentionally misregistered, and an original product-sum coefficient of that color is used. Note that the threshold values used in FIG. 16 are not limited to "3" and "6", and any experimentally calculated values can be used.

Although the calculations of converted values based on the misregistration amount of a pattern are described above, the image attributes in the classifying unit can also be changed on the basis of this misregistration amount. Conversely, the calculations of converted values can be changed on the basis of the classification result. For example, when ONE_LEVEL or FLAT described earlier is detected in the classifying unit, the value of a pixel of interest can be directly used as a converted value. This is effective to increase the processing speed.

Also, in the example shown in FIG. 16, a color having the maximum contrast is regarded as a priority color. However, when color components are Y, Cr, and Cb, for example, the Y component can be previously processed as a priority color.

In the arrangement shown in FIG. 16, a plurality of colors are processed in parallel with each other. Since this is to simplify the explanation, serial processing is naturally possible.

Furthermore, although 3×3 pixels are processed in the above example, 5×5 pixels can also be similarly processed.

In this embodiment of the present invention as described above, when input low-resolution information is converted into high-resolution information, an interpolation blur which is particularly a problem in natural images is not produced. Additionally, a conversion process with high image quality by which no jaggy is produced at all can be realized regardless of the low resolution of input original information. Also, when high-resolution information is formed, the process is not divided by the conventional threshold processing. Accordingly, a smooth clear image with continuity can e formed extremely easily even from a natural image. Furthermore, high-quality classification means can readily classify various image types. In the formation of high-resolution information from the classified images, nonlinear interpolation corresponding to any image type is realized only by changing the setting of coefficients. Also, a high-quality, high-resolution color image can be easily formed without producing any misregistration of any color.

As described above, it is possible by using the resolution conversion process of this embodiment to provide various products, such as a printer, a video printer, and application software, capable of outputting high-quality images even from images circulated on the internet or images with a small information amount, e.g., input images from a digital video camera.

In the first and second embodiments as described above, when input low-resolution information is converted into high-resolution information, an interpolation blur which is particularly a problem in natural images is not produced. Additionally, a conversion process with high image quality by which no jaggy is produced at all can be realized regardless of the low resolution of input original information. Also, when high-resolution information is formed, the process is not divided by the conventional threshold processing. Accordingly, a smooth clear image with continuity can be formed extremely easily even from a natural image. Furthermore, a high-quality, high-resolution color image can be easily formed without producing any misregistration of any color.

<Third Embodiment>

The second embodiment described above can have the following problem.

Assume that color image information, e.g., RGB colorspace image information is input in units of eight bits per pixel. In the above second embodiment, processing is performed for each color component. That is, the maximum and minimum values in a widow of nearest neighbor pixels surrounding a pixel of interest are detected, and various processes are performed to form high-resolution information by using these two values.

Figure 35:
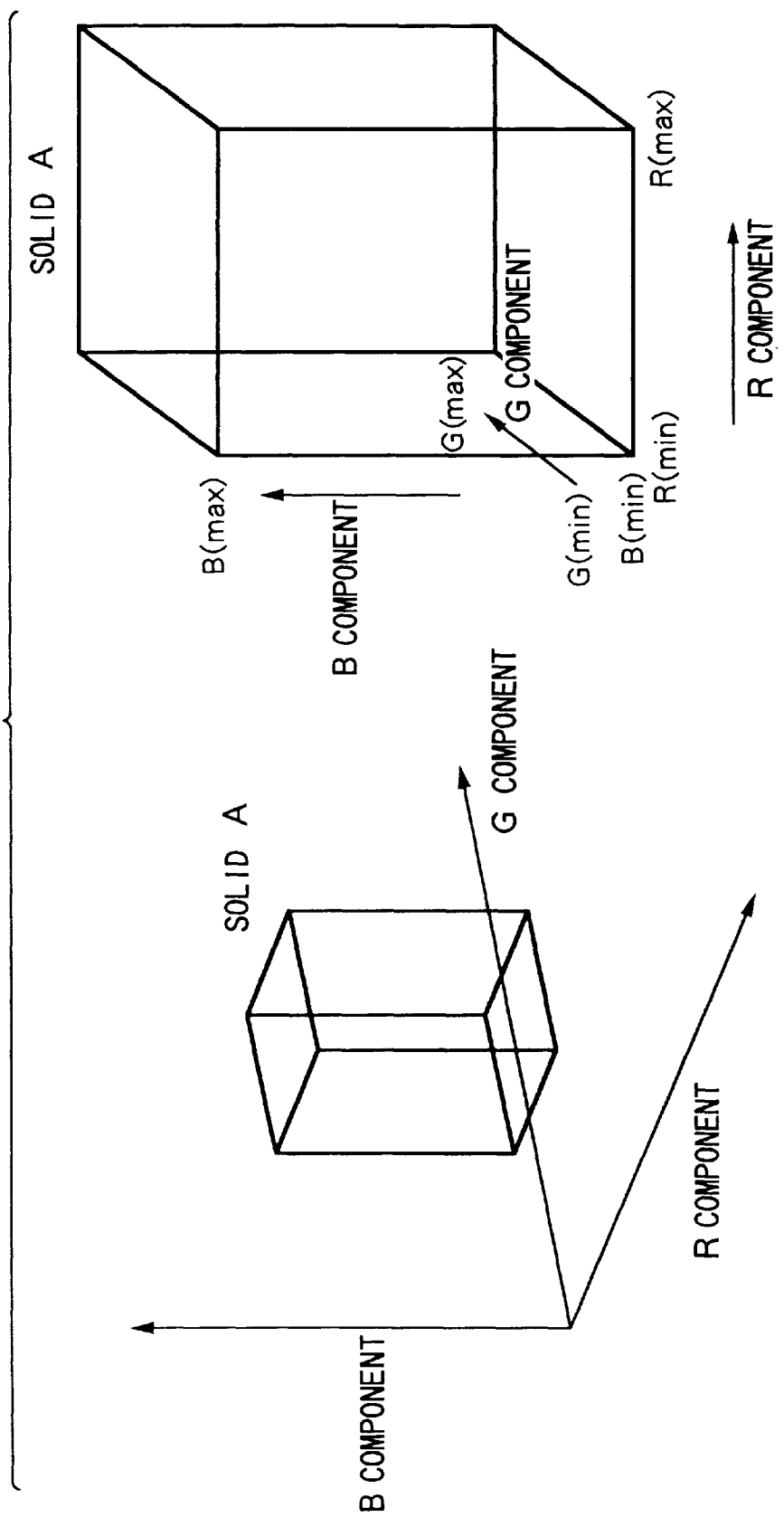
FIG. 35 is a view showing a solid formed by the maximum and minimum values in a color space.

This will be described below with reference to FIGS. 35, 36, and 37. FIG. 35 shows an RGB color space. In FIG. 35, a three-dimensional space is formed by three axes of R, G, and B. A solid A shown in FIG. 35 is constituted by the maximum and minimum values of each color in a nearest neighbor window of a certain pixel of interest. Each of the R, G, and B axes has two different values, i.e., the maximum and minimum values in the window. Therefore, the solid A is a hexahedron having eight apexes.

Figure 36:
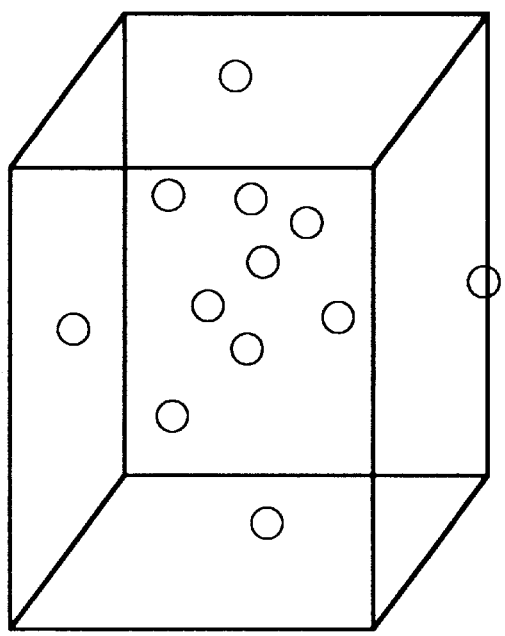
FIG. 36 is a view showing an example of an actual pixel value distribution in the solid shown in FIG. 35.
Figure 37:
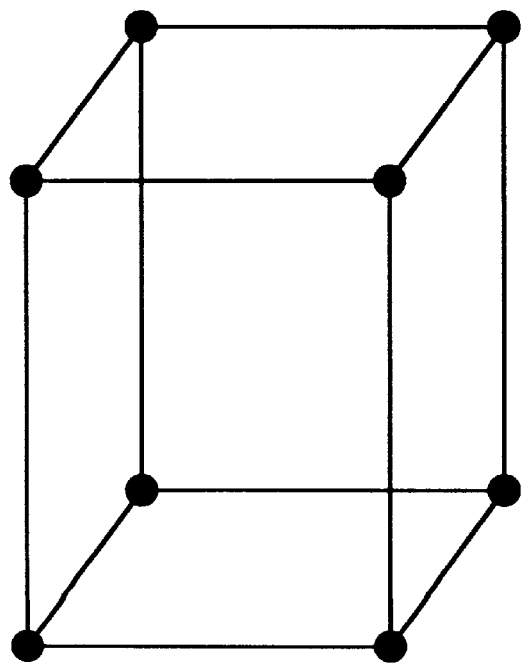
FIG. 37 is a view showing the eight apexes of the solid shown in FIG. 35.

FIG. 36 shows an example of the three-dimensional distribution of pixel values actually existing in the window. Open circles represent coordinate points where these pixel values exist. On the basis of the existing pixel values indicated by O, the maximum and minimum values of each axis are detected to form the solid A. A solid formed by the existing pixel values is naturally a small solid contained in the solid A. In other words, the pixel values existing in the window do not necessary include the eight apexes (indicated by closed circles in FIG. 37) of the solid A.

In the above second embodiment, however, the output value of each color is determined on the basis of the maximum and minimum values independently of the other colors. Therefore, this output value can take a value outside a small solid inside the solid A. Most extreme points among other points are the eight apexes of the solid A. If an extreme value outside an actual small solid is output, an extraordinary color not generated in an input image is generated, and this color visually stands out. This inevitably makes an output image give poor impression to an observer.

In the third embodiment of the present invention, therefore, when high-resolution color image data is produced from input color image data, high-quality, high-resolution color image data can be produced by suppressing color misregistration and generation of extraordinary colors.

The third embodiment according to the present invention will be described in detail below with reference to the accompanying drawings.

Figure 26:
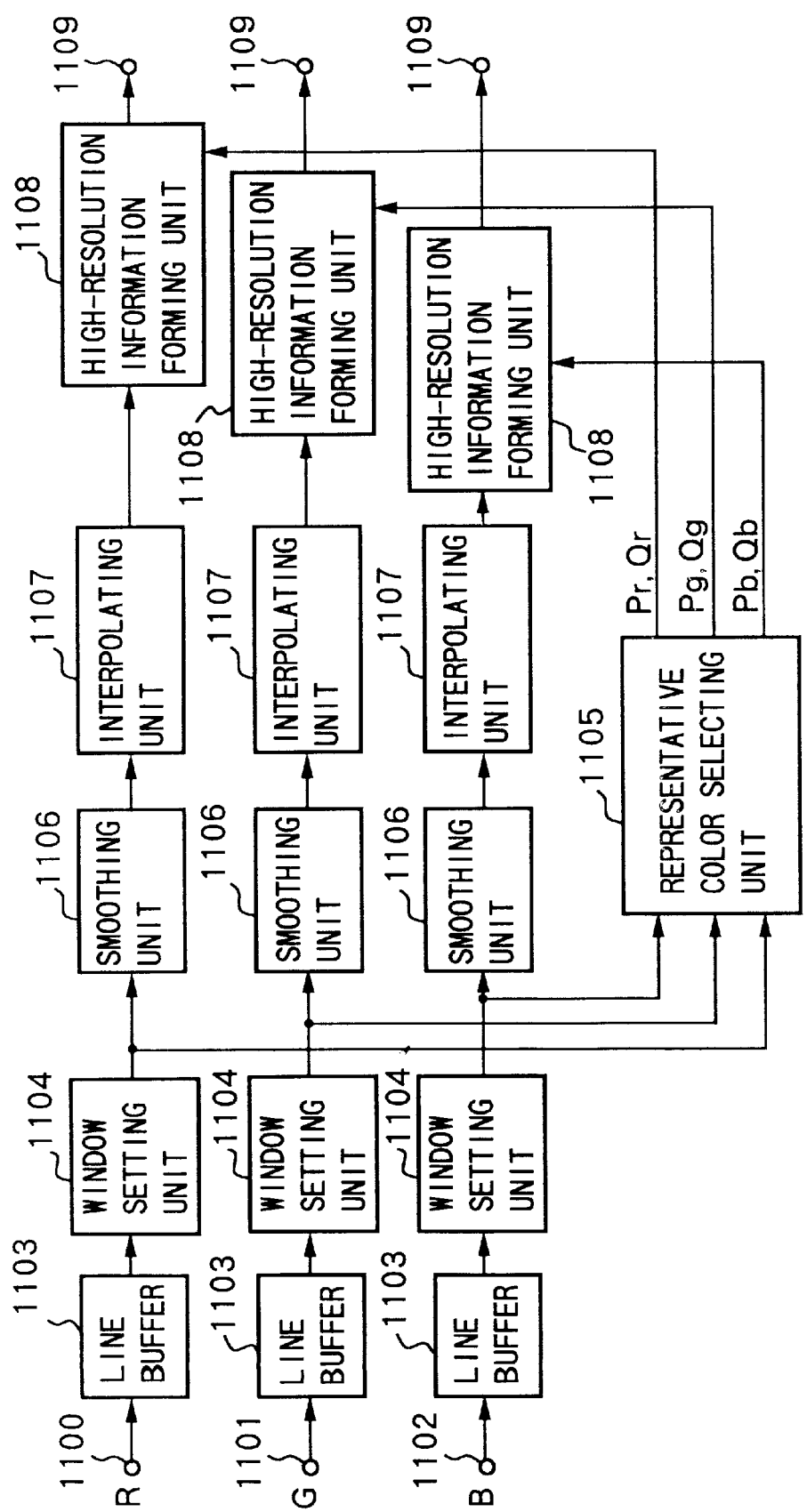
FIG. 26 is a block diagram showing the major components of the third embodiment of the present invention.

FIG. 26 is a block diagram showing the main components of an image processing apparatus according to the third embodiment. Note that an image processing apparatus herein mentioned can be an image output apparatus such as a printer connected to a computer or a video printer for inputting video signals. However, this image processing apparatus can also be an internal processing circuit of such an image output apparatus. Alternatively, the image processing apparatus can be an image processing apparatus other than an image output apparatus. For example, the image processing apparatus can be incorporated as internal application software of computer or printer driver software for outputting data to a printer. That is, as will be apparent from the following description, the present invention includes not only hardware but also software.

The operation procedure of the third embodiment will be described below with reference to the block diagram in FIG. 26. In this embodiment, input image information is converted into information having Nx and Mx pixels.

In FIG. 26, reference numerals 1100, 1101, and 1102 denote input terminals through which low-resolution color image information is input. More specifically, the input terminals 1100, 1101, and 1102 input image information of R, G, and B components, respectively. To simplify the explanation, the input terminals are provided parallel for the R, G, and B components. However, these components can also be transmitted serially from one input terminal.

The input sequence of the RGB image information can be either point sequence or line sequence. Line buffers 1103 independently store and hold a few lines of this low-resolution image information for their respective colors. From this image information of a few lines, a window of a plurality of two-dimensional nearest neighbor pixels including a pixel of interest is set for each of R, G, and B (window setting units 1104).

Figures 27, 28:
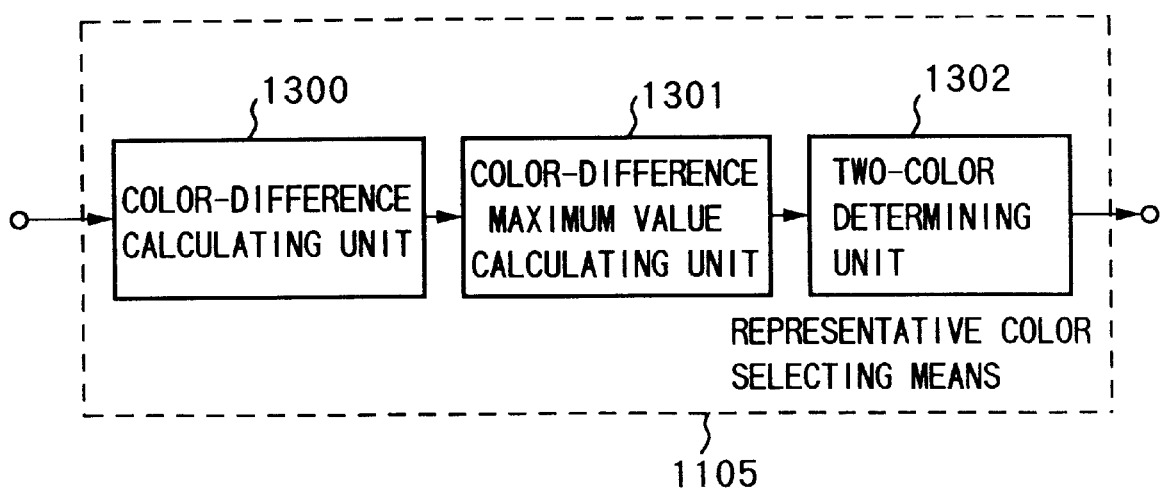
FIG. 27 is a view showing an example of a window.
FIG. 28 is a block diagram showing a representative color selecting unit shown in FIG. 26.

As shown in FIG. 27, this window is a rectangle having the pixel of interest in its center. However, the window can naturally have a shape other than a rectangle. Referring to FIG. 27, the asterisk in the center indicates a pixel of interest E, and this pixel of interest E and eight nearest neighbor pixels surrounding the pixel of interest E constitute the window.

A representative color selecting unit 1105 selects two existing colors from the image information in three different windows of R, G, and B. In the window shown in FIG. 27, for example, a maximum of nine colors exist if all of the nine pixels in the window have different colors (combinations of the R, G, and B components). The representative color selecting unit 1105 is a means for selecting two colors from these nine colors. If the nine pixels in the window have the same color, the existing color is of course only one color. Therefore, only this one color is output. The configuration of the representative color selecting unit 1105 will be described later.

Smoothing units 1106 are means for independently smoothing the pixel of interest and its nearest neighbor pixels for their respective colors. The process of smoothing can be accomplished by an LPF (Low-Pass Filter). Alternatively, it is possible to convert feature amounts such as patterns into numerical values on the basis of the pixel value distribution state in the window and calculate values after the smoothing by inputting these numerical values to an LUT (Look-Up Table). In either case, the smoothing process is important because it is essential to remove the resolution dependence of the input low-resolution information. However, an image such as a natural image originally having little resolution dependence when input can also be passed through the smoothing so as not to loose detailed information.

Interpolating units 1107 independently perform linear interpolation for their several colors. Although the process of the interpolating unit is not limited to linear interpolation, linear interpolation is a method capable of obtaining the maximum effect most easily. This interpolating unit increases one pixel of interest to the number of pixels corresponding to the output resolution.

For example, in conversion by which image information of 72 dpi (dot per inch) is output to a 720-dpi printer, magnifications N and M are N=M=10. Therefore, each interpolating unit converts one pixel of interest into interpolated information of 100 (=10×10) pixels.

After the interpolating units 1107 obtain the number of pixels corresponding to the output resolution, high-resolution information forming units 1108 convert the pixel value of each interpolated pixel into a pixel value corresponding to the high resolution. In this resolution information formation process, R-, G-, and B-component information of the two colors selected by the selecting unit 1105 are used.

Assume that the two selected colors are P and Q (RGB components of P and Q are P=(Pr,Pg,Pb) and Q=(Qr,Qg,Qb)). That is, two types of information Pr and Qr of the R component, two types of information Pg and Qg of the G component, and two types of information Pb and Qb of the B component are transmitted to the high-resolution information forming units.

A notable characteristic feature of this third embodiment is that the values used in the forming units are selected by evaluating the three components.

Letting Pi and Qi be the interpolated value of a color component i at each interpolation point k be $C_i(k)$ and the values of the color components P and Q, an output value hi(k) from the high-resolution information forming unit is calculated by the following arithmetic operations.

[When $Ci(k) \geq (Pi+Qi)/2$]

$$hi(k)=(\alpha Ci(k)+\beta MAX(Pi,Qi)/(\alpha+\beta)$$

However, if $hi(k)>MAX(Pi,Qi)$, $$hi(k)=MAX(Pi,Qi) \qquad (8)$$

[When $Ci(k)<(Pi+Qi)/2$]

$$hi(k)=(\alpha Ci(k)+\beta MIN(Pi,Qi)/(\alpha+\beta)$$

However, if $hi(k)<MIN(Pi,Qi)$, $$hi(k)=MIN(Pi,Qi) \qquad (9)$$

(where $\alpha$ and $\beta$ are coefficients, MAX(Pi,Qi) is a function for selecting a larger one of Pi and Qi, and MIN(Pi,Qi) is a function for selecting a smaller one of Pi and Qi.)

Equations (8) and (9) are examples of the formation of high-resolution information. Another example is an arithmetic operation which continuously changes without using any threshold processing. hi(k) of each color thus calculated is output from an output terminal 1109.

FIG. 28 shows the configuration of the selecting unit 1105. In FIG. 28, reference numeral 1300 denotes a color-different calculating unit; 1301, a color-difference maximum value calculating unit; and 1302, a two-color determining unit. In the window shown in FIG. 27, combinations of two colors are selected from nine colors. The number of combinations is 9C2=36.

The color-difference calculating unit 1300 calculates the color difference in these thirty-six combinations of two colors. That is, assuming that the two colors of a combination are A and B (color components of A and B are A=(Ar,Ag,Ab) and B=(Br,Bg,Bb)), a color difference E is calculated as follows.

$$E=((Ar-Br)^{\wedge}2+(Ag-Bg)^{\wedge}2+(Ab-Bb)^{\wedge}2)^{\wedge}\tfrac{1}{2} \qquad (10)$$

(where ^ represents the power, e.g., x^y means the yth power of x.)

Since only the difference between two pixels is calculated to check their sizes, the ½ power of equation (10) can be omitted. This part is rather unnecessary when the speed of the operation is important. If the load of the second power operation is high, the sum of the absolute values of the color component differences can be used. This further simplifies the operation and increases the operation speed.

The color-difference maximum value calculating unit 1301 comprises a comparator and calculates the maximum value of the color differences of the thirty-six combinations calculated by equation (10). The two-color determining unit 1302 outputs detected two colors having the largest color difference as the representative colors in the window.

The representative color selecting unit described above is the greatest characteristic feature of this embodiment. The effect of the embodiment will be described below by comparing to the second embodiment with reference to FIGS. 29 and 30.

Figure 29:
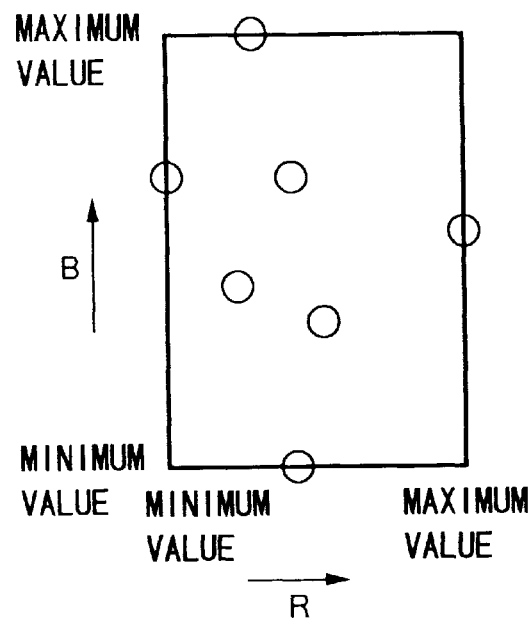
FIG. 29 is a view showing a color distribution.

FIG. 29 shows the distribution of pixel values in the window. For the sake of simplicity, the distribution of an RGB three-dimensional space will be described as the distribution of an RGB two-dimensional space by assuming that the value of G is uniform.

Referring to FIG. 29, open circles indicate the distribution of the nine pixels in the window shown in FIG. 27. Only seven O marks are shown in FIG. 29 because some pixels have the same value.

Figure 30:
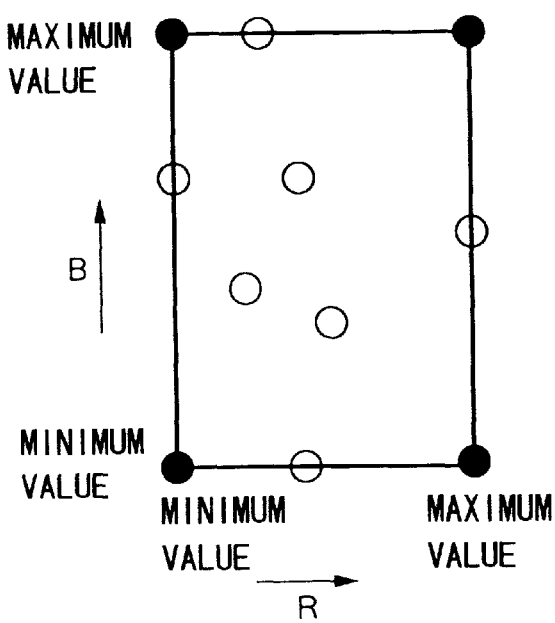
FIG. 30 is a view showing an example of a method of selecting the maximum and minimum values in the color distribution shown in FIG. 29.

FIG. 30 shows the method of detecting the maximum and minimum values for each color component as described previously. When calculated values are clipped by the maximum and minimum values, as described earlier, a range enclosed by closed circles in FIG. 30 is obtained as the range of color coordinates generated in the formation of high resolution information. Since this range is wide, an extraordinary color not originally existing in nearest neighbor pixels is generated.

Figure 31:
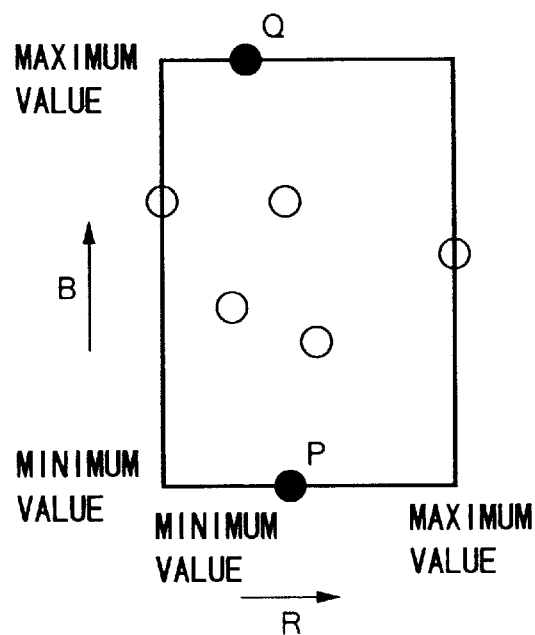
FIG. 31 is a view showing an example of selection performed in the color distribution shown in FIG. 29 by the third embodiment.
Figure 32:
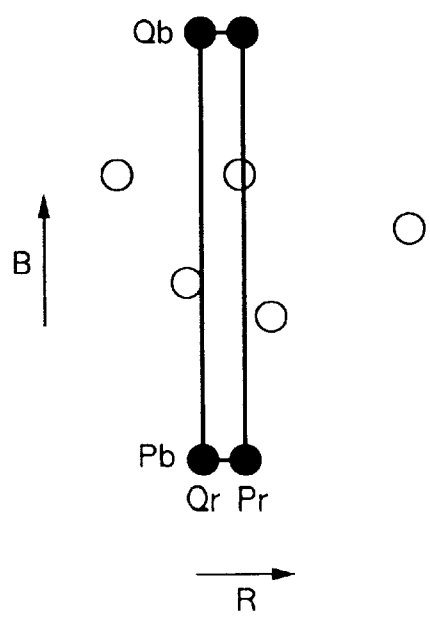
FIG. 32 is a view for explaining the range of colors generated by the selection shown in FIG. 31.

FIG. 31 is a view showing the state in which two points where the color difference is a maximum are selected by the representative color selecting unit 1105 of the third embodiment. Two points indicated by closed circles are representative points detected to have the largest color difference, and these points are denoted by P and Q. A portion indicated by the solid lines in FIG. 32 is the range of high-resolution information expressed by the detected points P and Q. This range is narrow because it is clipped by the values of Pr, Qr, Pb, and Qb, not by the maximum and minimum values. Accordingly, no extraordinary color is generated, so a good color gradation change can be expressed from P to Q.

Figure 33:
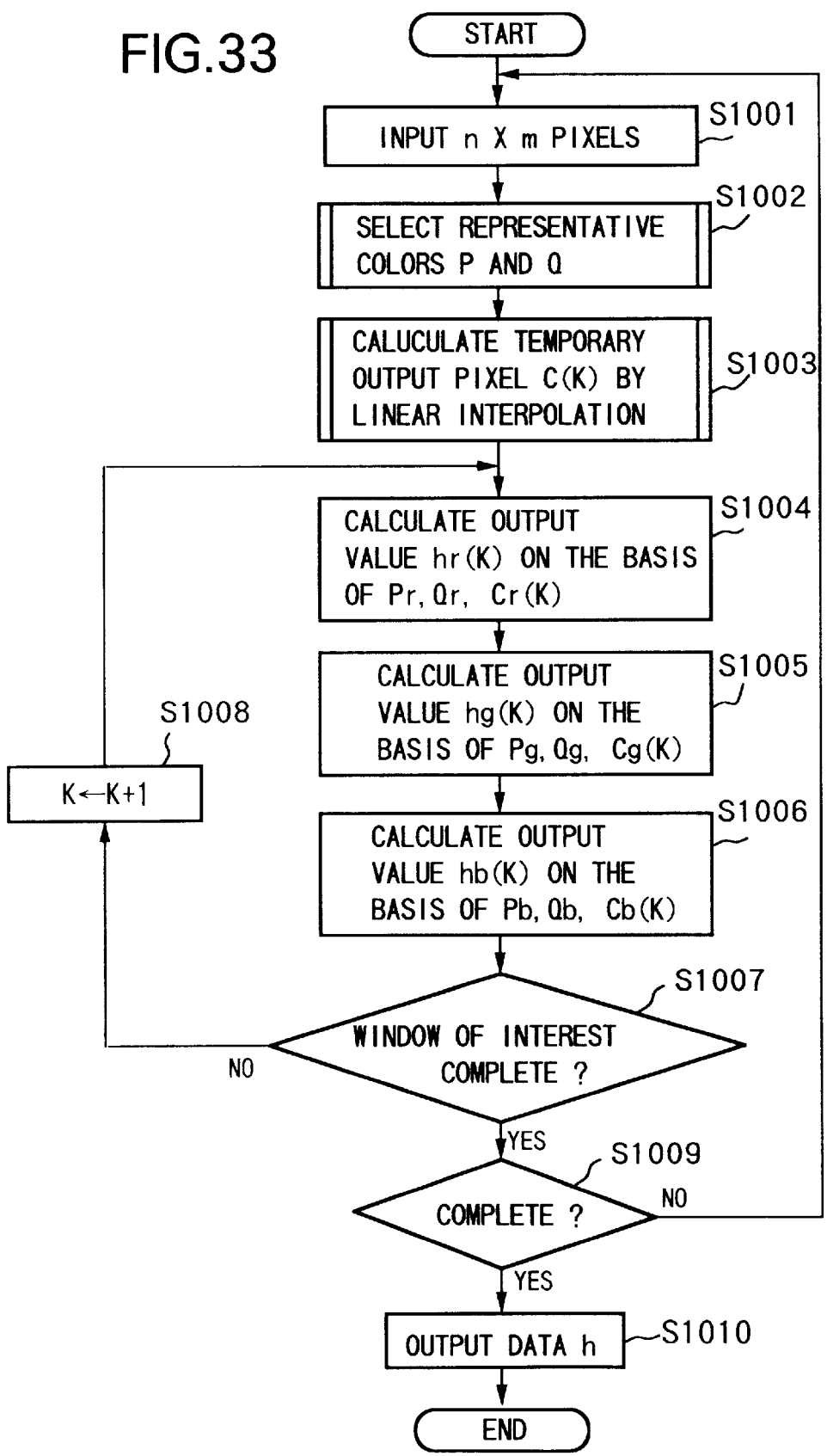
FIG. 33 is a flow chart showing an example of processing for realizing the processing of the third embodiment by software.

FIG. 33 is a flow chart showing an example of the above process when the process is accomplished by software.

First, in step S1001, n×m color pixels (called a window in the above process) are input. In step S1002, two pixels P and Q having the largest color difference are selected from the n×m pixels.

The flow then advances to step S1003 to linearly interpolate the input n×m pixels, thereby calculating temporary output pixel data C(k) after enlargement (or after resolution is increased).

Given one temporary output pixel value C(k), original output pixel values h(k), i.e., hr(k), hg(k), and hb(k) of R, G, and B components are calculated in steps S1004 to S1006.

To repetitively perform this process in step S1007 for all of the temporary output pixels calculated in step S1003, k is incremented by "1" (step S1008).

When the output pixel values h(k) in the window of interest are thus generated, the flow advances to step S1009 to check whether the input image data is completely processed. If NO in step S1009, the flow returns to step S1001 to process the next pixel block.

If YES is finally determined in step S1009, this means that the output pixel values h(k) store output pixel data of individual colors after enlargement or the formation of high-resolution information. Therefore, this output pixel data is output to lower processing (e.g., output to a printer engine).

Note that the data output timing is not necessarily the step shown in FIG. 33. For example, the data can be output immediately after step S1006 or S1007. In some cases, the data can be output when the process in the main scan direction of the input image data is complete.

<Fourth Embodiment>

Figure 34:
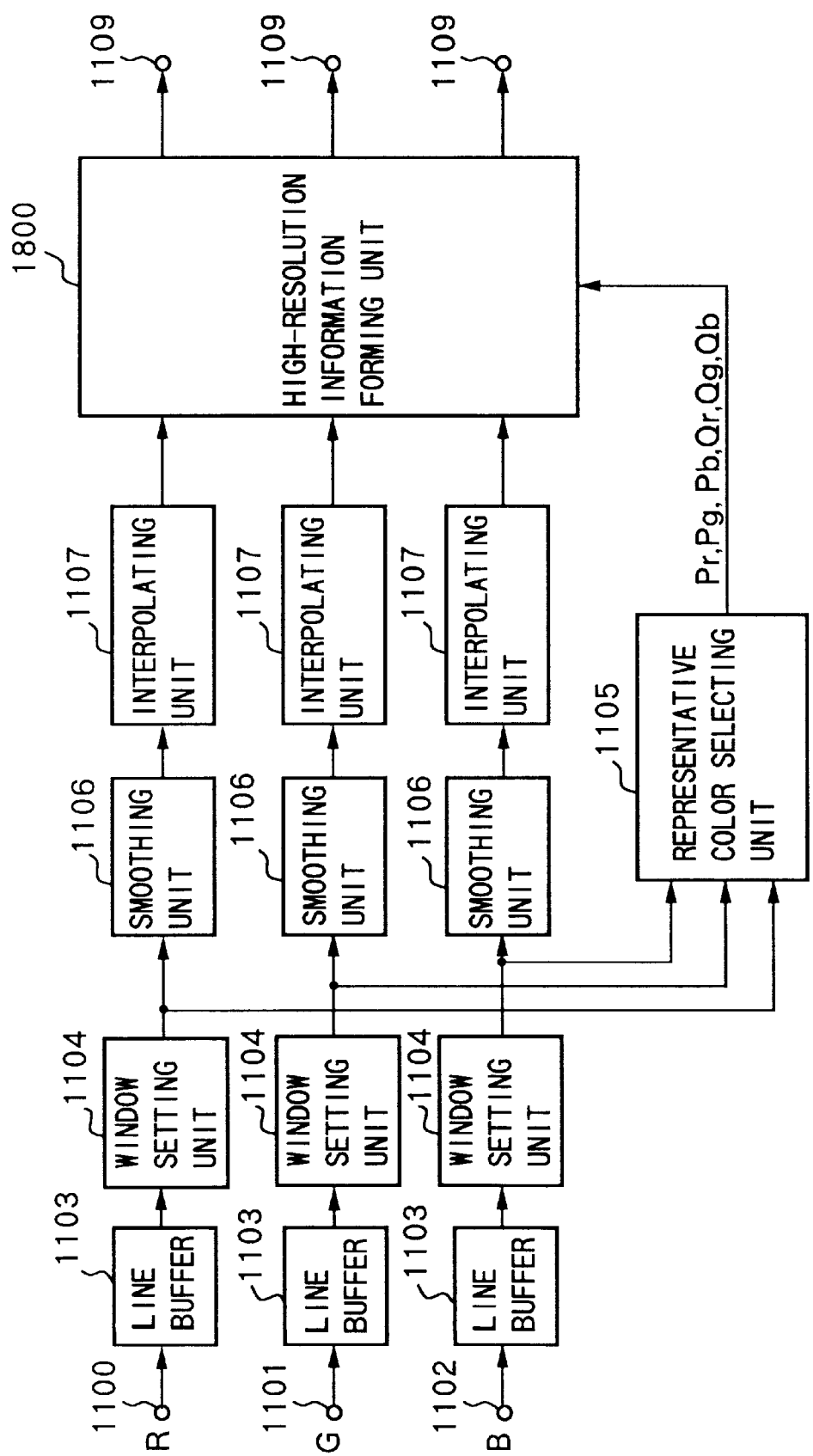
FIG. 34 is a block diagram showing the major parts of the fourth embodiment of the present invention.

FIG. 34 is a block diagram showing the fourth embodiment of the present invention. This fourth embodiment differs from the above third embodiment in the arrangement of a high-resolution information forming unit. In the third embodiment described above, of a series of resolution converting processes, only the representative color selecting unit performs the steps using information of colors other than a color component to be processed. This fourth embodiment is characterized in that the information of three color components is used not only in a representative color selecting unit but also in a high-resolution information forming unit.

In FIG. 34, the same reference numerals as in FIG. 26 denote parts having essentially the same functions. Therefore, only different points will be described below.

Referring to FIG. 34, a representative color selecting unit 1105 selects a combination of two colors having the largest color difference, as in the third embodiment. Color components P=(Pr,Pg,Pb) and Q=(Qr,Qg,Qb) of the two selected colors are supplied to a high-resolution forming unit 1800. This high-resolution information forming unit 1800 forms high-resolution information in the following manner.

1. When $Pr \geq Qr$ and $Pg \geq Qg$ and $Pb \geq Qb$
((a) If $Cr(k) \geq (Pr+Qr)/2$ and $Cg(k) \geq (Pg+Qg)/2$ and $Cb(k) \geq (Pb+Qb)/2$)

$$hi(k)=(\alpha Ci(k)+\beta Pi)/(\alpha+\beta)$$

However, if $hi(k)>Pi$ or $hi(k)<Pi$, $$hi(k)=Pi \qquad (11)$$

((b) If $Cr(k)<(Pr+Qr)/2$ and $Cg(k)<(Pg+Qg)/2$ and $Cb(k)<(Pb+Qb)/2$)

$$hi(k)=(\alpha Ci(k)+\beta Qi)/(\alpha+\beta)$$

However, if $hi(k)>Qi$ or $hi(k)<Qi$, $$hi(k)=Qi \qquad (12)$$

((c) In cases other than (a) and (b) above)

$$hi(k)=Ci(k) \qquad (13)$$

2. When $Pr \geq Qr$ and $Pb \geq Qg$ and $Pb < Qb$
((a) If $Cr(k) \geq (Pr+Qr)$ and $Cg(k) \geq (Pg+Qg)/2$ and $Cb(k)<(Pb+Qb)/2$)

$$hi(k)=(\alpha Ci(k)+\beta Pi)/(\alpha+\beta)$$

However, if $hi(k)>Pi$ or $hi(k)<Pi$, $$hi(k)=Pi \qquad (14)$$

((b) If $Cr(k)<(Pr+Qr)/2$ and $Cg(k)<(Pg+Qg)/2$ and $Cb(k) \geq (Pb+Qb)/2$)

$$hi(k)=(\alpha Ci(k)+\beta Qi)/(\alpha+B)$$

However, if $hi(k)>Qi$ or $hi(k)<Qi$, $$hi(k)=Qi \qquad (15)$$

((c) In cases other than (a) and (b) above)

$$hi(k)=Ci(k) \qquad (16)$$

3. When $Pr \geq Qr$ and $Pg < Qg$ and $Pb \geq Qb$
((a) If $Cr(k) \geq (Pr+Qr)/2$ and $Cg(k)<(Pg+Qg)/2$ and $Cb(k) \geq (Pb+Qb)/2$)

$$hi(k)=(\alpha Ci(k)+\beta Pi)/(\alpha+\beta)$$

However, if $hi(k)>Pi$ or $hi(k)<Pi$, $$hi(k)=Pi \qquad (17)$$

((b) If $Cr(k)<(Pr+Qr)/2$ and $Cg(k) \geq (Pg+Qg)/2$ and $Cb(k)<(Pb+Qb)/2$)

$$hi(k)=(\alpha Ci(k)+\beta Qi)/(\alpha+\beta)$$

However, if $hi(k)>Qi$ or $hi(k)<Qi$, $$hi(k)=Qi \qquad (18)$$

((c) In cases other than (a) and (b) above)

$$hi(k)=Ci(k) \qquad (19)$$

4. When $Pr \geq Qr$ and $Pb < Qg$ and $Pb < Qb$
((a) If $Cr(k) \geq (Pr+Qr)$ and $Cg(k)<(Pg+Qg)/2$ and $Cb(k)<(Pb+Qb)/2$)

$$hi(k)=(\alpha Ci(k)+\beta Pi)/(\alpha+\beta)$$

However, if $hi(k)>Pi$, $$hi(k)=Pi \qquad (20)$$

((b) If $Cr(k)<(Pr+Qr)/2$ and $Cg(k) \geq (Pg+Qg)/2$ and $Cb(k) \geq (Pb+Qb)/2$)

$$hi(k)=(\alpha Ci(k)+\beta Qi)/(\alpha+B)$$

However, if $hi(k)>Qi$ or $hi(k)<Qi$, $$hi(k)=Qi \qquad (21)$$

((c) In cases other than (a) and (b) above)

$$hi(k)=Ci(k) \qquad (22)$$

5. When $Pr < Qr$ and $Pg \geq Qg$ and $Pb \geq Qb$
((a) If $Cr(k)<(Pr+Qr)/2$ and $Cg(k) \geq (Pg+Qg)/2$ and $Cb(k) \geq (Pb+Qb)/2$)

$$hi(k)=(\alpha Ci(k)+\beta Pi)/(\alpha+\beta)$$

However, if $hi(k)>Pi$ or $hi(k)<Pi$, $$hi(k)=Pi \qquad (23)$$

((b) If $Cr(k) \geq (Pr+Qr)/2$ and $Cg(k)<(Pg+Qg)/2$ and $Cb(k)<(Pb+Qb)/2$)

$$hi(k)=(\alpha Ci(k)+\beta Qi)/(\alpha+B)$$

However, if $hi(k)>Qi$ or $hi(k)<Qi$, $$hi(k)=Qi \qquad (24)$$

((c) In cases other than (a) and (b) above)

$$hi(k)=Ci(k) \qquad (25)$$

6. When $Pr < Qr$ and $Pb \geq Qg$ and $Pb < Qb$
((a) If $Cr(k) \geq (Pr+Qr)$ and $Cg(k) \geq (Pg+Qg)/2$ and $Cb(k)<(Pb+Qb)/2$)

$$hi(k)=(\alpha Ci(k)+\beta Pi)/(\alpha+\beta)$$

However, if $hi(k)>Pi$ or $hi(k)<Pi$, $$hi(k)=Pi \qquad (26)$$

((b) If $Cr(k) \geq (Pr+Qr)/2$ and $Cg(k)<(Pg+Qg)/2$ and $Cb(k) \geq (Pb+Qb)/2$)

$$hi(k)=(\alpha Ci(k)+\beta Qi)/(\alpha+B)$$

However, if $hi(k)>Qi$ or $hi(k)<Qi$, $$hi(k)=Qi \qquad (27)$$

((c) In cases other than (a) and (b) above)

$$hi(k)=Ci(k) \qquad (28)$$

7. When Pr<Qr and Pg<Qg and Pb≧Qb ((a) If Cr(k)<(Pr+Qr)/2 and Cg(k)<(Pg+Qg)/2 and Cb(k)≧(Pb+Qb)/2)

$$hi(k)=(\alpha Ci(k)+\beta Pi)/(\alpha+\beta)$$

However, if hi(k)>Pi or hi(k)<Pi, $$hi(k)=Pi \qquad (29)$$

((b) If Cr(k)≧(Pr+Qr)/2 and Cg(k)≧(Pg+Qg)/2 and Cb(k)<(Pb+Qb)/2)

$$hi(k)=(\alpha Ci(k)+\beta Qi)/(\alpha+B)$$

However, if hi(k)>Qi or hi(k)<Qi, $$hi(k)=Qi \qquad (30)$$

((c) In cases other than (a) and (b) above)

$$hi(k)=Ci(k) \qquad (31)$$

8. When Pr<Qr and Pb<Qg and Pb<Qb ((a) If Cr(k)<(Pr+Qr) and Cg(k)<(Pg+Qg)/2 and Cb(k)<(Pb+Qb)/2)

$$hi(k)=(\alpha Ci(k)+\beta Pi)/(\alpha+\beta)$$

However, if hi(k)>Pi or hi(k)<Pi $$hi(k)=Pi \qquad (32)$$

((b) If Cr(k)≧(Pr+Qr)/2 and Cg(k)≧(Pg+Qg)/2 and Cb(k)≧(Pb+Qb)/2)

$$hi(k)=(\alpha Ci(k)+\beta Qi)/(\alpha+B)$$

However, if hi(k)>Qi or hi(k)<Qi, $$hi(k)=Qi \qquad (33)$$

((c) In cases other than (a) and (b) above)

$$hi(k)=Ci(k) \qquad (34)$$

(where $\alpha$ and $\beta$ are coefficients, and i is a color component corresponding to each of R, G, and B.)

The high-resolution information of R, G, and B thus formed are transmitted to output terminals 1109, and high-quality image information are output.

The characteristic feature of the fourth embodiment is the formation of high-resolution information which is more finely controlled. That is, if the interpolation point of an interpolating unit is obviously close to the positions of points P and Q as representative colors, a process of reducing the distance is performed. If the position of the interpolation point is far, the value of this interpolation point is output. By this process it is possible to further narrow the range within which an extraordinary color is generated and freely determine the output value on the basis of the three-dimensional position of the interpolation point.

The formation of high-resolution information using a plurality of color components is described above. However, the method of forming high-resolution information is naturally not limited to the one based on equations (8), (9), and (11) to (34). Examples are the method using an LUT and the method of performing arithmetic operations by setting functions described in the first and second embodiments. In this embodiment, the process of selecting two representative colors and approximating output values to these two colors is described. However, the number of representative colors is not limited to 2. When three or more colors are selected as representative colors, it is possible to perform finer control and form better high-resolution information. The trade-off is a complicated process which requires a longer execution time.

When equations (8), (9), and (11) to (34) are gathered, the output value is basically calculated by using the following equation on a case-by-case basis.

$$hi(k)=\alpha Ci(k)+\beta Pi+\gamma Qi \qquad (35)$$

(where $\alpha$, $\beta$, and $\gamma$ and are coefficients, and i is a color component corresponding to each of R, G, and B.)

When representative values (S0, S1, S2, ..., Sn) of three or more colors are used, the above equation can be generally rewritten as follows.

$$hi(k)=\alpha \cdot Ci(k)+\Sigma \beta j \cdot Sji \qquad (36)$$

(where $\Sigma$ is a sum total related to a variable j, variable j=0, 1, ..., n−1, and $\alpha$ and $\beta j$ are predetermined coefficients.)

The above embodiment is described by taking RGB as an example of a color space. However, various color spaces such as L*a*b* as a uniform color space and CMYK as colors expressed by a printer are possible. Also, a method of minimizing the color difference is described as an example of the representative color selection method, but the method is not limited to this one. One example is a method of giving priority to a color component by which the contrast (maximum value−minimum value) in the window is a maximum, and specifying a representative color from pixels having the maximum and minimum values of this priority color.

The present invention can be applied to a system constituted by a plurality of devices (e.g., host computer, interface, reader, printer) or to an apparatus (e.g., copying machine, facsimile) comprising a single device.

Further, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Also, the storage medium, such as a floppy disk, a hard disk, an optical disk, a magneto-optical disk, CD-ROM, CD-R, a magnetic tape, a non-volatile type memory card, and ROM can be used for providing the program codes.

In addition, besides aforesaid functions according to the above embodiments are realized by executing the program codes which are read by a computer, the present invention includes a case where on OS (Operating System) or the like running on the computer performs a part or entire processes in accordance with designations of the program codes and realizes functions according to the above embodiments.

Moreover, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

In the third and fourth embodiments as described above, when high-resolution color image data is formed from input color image data, it is possible to prevent color misregistration or generation of extraordinary colors. In addition, interpolating techniques having a high degree of freedom of design and capable of improving image quality can be realized. Accordingly, the present invention is readily applicable to various products, and high-quality outputs can be expected even from images having a small information amount.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for converting low-resolution information into high-resolution information to increase the number of pixels of input image information, comprising:

first window forming means for forming a first window for referring to nearest neighbor pixels of a low-resolution pixel of interest;

detecting means for detecting a plurality of representative values from the first window;

converting means for converting a value of the pixel of interest by an adaptive low-pass filter (LPF);

second window forming means for forming a second window for referring to converted values of the nearest neighbor pixels including the pixel of interest;

linear interpolating means for performing linear interpolation on the basis of pixel value information in the first window or converted value information in the second window; and nonlinear interpolating means for performing nonlinear interpolation by executing a plurality of different product-sum operations based on linearly interpolated values from said linear interpolating means and the representative values, and for obtaining high-resolution information, using results of the executed plurality of different product-sum operations.

2. The apparatus according to claim 1, further comprising coefficient setting means for dynamically setting product-sum coefficients of the product-sum operations by said nonlinear interpolating means.

3. The apparatus according to claim 2, further comprising classifying means for classifying an attribute of the pixel of interest by evaluating a distribution state of pixel values in the first window, and wherein the product-sum coefficients of the product-sum operations by said linear interpolating means are dynamically set on the basis of an attribute classification result from said classifying means.

4. The apparatus according to claim 3, wherein said classifying means evaluates discreteness of pixel values in the first window.

5. The apparatus according to claim 3, wherein said classifying means evaluates the number of gradation levels of pixel values in the first window.

6. The apparatus according to claim 4, wherein when the number of gradation levels in the window is not less than 3, the discreteness is evaluated by extracting not less than three representative values including maximum and minimum values in the window and calculating differences between the representative values.

7. The apparatus according to claim 6, wherein the not less than three representative values are the maximum value, the minimum value, a value A not smaller than an average value of the maximum and minimum values and except for and closest to the maximum value, a value B not smaller than the average value of the maximum and minimum values and except for and farthest from the maximum value, a value C smaller than the average value of the maximum and minimum values and except for and closest to the minimum value, and a value D smaller than the average value of the maximum and minimum values and except for and farthest from the minimum value.

8. The apparatus according to claim 7, wherein the discreteness is evaluated by evaluating absolute values of differences between the maximum value and A, the maximum value and B, C and the minimum value, and D and the minimum value.

9. The apparatus according to claim 7, wherein the discreteness is evaluated by evaluating relative values of differences between the maximum value and A, the maximum value and B, C and the minimum value, and D and the minimum value.

10. The apparatus according to claim 3, wherein filter characteristics of said adaptive LPF of said converting means are changed on the basis of the attribute information classified by said classifying means.

11. The apparatus according to claim 1, wherein said converting means calculates converted values by a product-sum operation of the representative values.

12. The apparatus according to claim 11, wherein said converting means calculates product-sum coefficients of the product-sum operations on the basis of a feature amount in the first window.

13. The apparatus according to claim 12, wherein the feature amount is a pattern obtained by quantizing the first window.

14. The apparatus according to claim 1, wherein the representative values are maximum and minimum values in a window of n×n pixels (n≧2) including the pixel of interest.

15. The apparatus according to claim 1, wherein the representative values are maximum and minimum values in a window of n×n pixels (n≧2) including the pixel of interest and maximum and minimum values in a window of m×m pixels (m≧n) including the n×n pixels.

16. The apparatus according to claim 1, further comprising classifying means for classifying an attribute of the pixel of interest by evaluating a distribution state of pixel values in the first window, and wherein the linear interpolation is executed by switching the pixel value information in the first window and the converted value information in the second window on the basis of an attribute classification result from said classifying means.

17. The apparatus according to claim 1, wherein a plurality of product-sum coefficients of the linearly interpolated values and the representative values are used to output an optimum value in accordance with magnitudes of a plurality of product-sum results.

18. An image processing apparatus for converting color low-resolution information into high-resolution information to increase the number of pixels of input image information, comprising:

first window forming means for forming a first window for referring to nearest neighbor pixels of a low-resolution pixel of interest for each color component;

detecting means for detecting a plurality of representative values from the first window for each color component;

converting means for converting a value of the pixel of interest for each color component by an adaptive low-pass filter (LPF) on the basis of information of a plurality of color components in the first window;

second window forming means for forming a second window for referring to converted values of the nearest neighbor pixels including the pixel of interest for each color component;

linear interpolating means for performing linear interpolation on the basis of pixel value information in the first window or converted value information in the second window for each color component; and nonlinear interpolating means for performing nonlinear interpolation by executing a plurality of different product-sum operations based on linearly interpolated values from said linear interpolating means and the representative values for each color component, and for obtaining high-resolution information, using results of the executed plurality of different product-sum operations.

19. The apparatus according to claim 18, further comprising:

pattern forming means for forming a pattern by quantizing the first window for each color component;

evaluating means for evaluating approximateness of the pattern of each color component; and calculating means for calculating converted values by a product-sum operation of a plurality of representative values for each color component, and wherein a product-sum coefficient is set on the basis of an evaluation result from said evaluating means.

20. The apparatus according to claim 19, further comprising:

selecting means for selecting a priority color on the basis of the pixel value information in the first window of each color component; and evaluating means for evaluating approximateness of a pattern of the priority color to a pattern of a color other than the priority color, and wherein if the approximateness is not less than a preset threshold value, a product-sum coefficient of the color other than the priority color is set on the basis of a product-sum coefficient of the priority color.

21. The apparatus according to claim 19, wherein the approximateness is evaluated by performing an EX-OR bit operation for each pattern.

22. The apparatus according to claim 20, wherein the priority color is determined by a value of contrast in the first window.

23. An image processing method of converting low-resolution information into high-resolution information to increase the number of pixels of input image information, comprising the steps of:

a first window formation step of forming a first window for referring to nearest neighbor pixels of a low-resolution pixel of interest;

a detection step of detecting a plurality of representative values from the first window;

a conversion step of converting a value of the pixel of interest by an adaptive low-pass filter (LPF);

a second window formation step of forming a second window for referring to converted values of the nearest neighbor pixels including the pixel of interest;

a linear interpolation step of performing linear interpolation on the basis of pixel value information in the first window or converted value information in the second window; and a nonlinear interpolation step of performing nonlinear interpolation by executing a plurality of different product-sum operations based on linearly interpolated values from the linear interpolation step and the representative values, and for obtaining high-resolution information, using results of the executed plurality of different product-sum operations.

24. An image processing apparatus for inputting color image data and generating color image data having a higher resolution than a resolution of the input color image data, comprising:

selecting means for selecting representative colors from a processing unit block constituted by a pixel of interest and nearest neighbor pixels thereof in the input color image data, the number of representative colors being less than the number of pixels constituting the processing unit block and at least two;

interpolating means for interpolating the pixel of interest on the basis of the input color image data in the processing unit block to generate a plurality of interpolated pixel data; and calculating means for calculating data of a color component i of output pixel data by performing a product-sum operation using data of the color component i of the interpolated pixel data and data of the color component i of the representative colors selected by said selecting means.

25. The apparatus according to claim 24, wherein letting k be an output position, $C_i(k)$ be the color component i of the interpolated pixel data in the output position k, $S0_i, S1_i, \ldots, Sn_i$ be the representative colors selected by said selecting means be $S0, S1, \ldots, Sn$, the color component i of the representative colors, $h(k)$ be the output pixel data, and $hi(k)$ be the color component i of the output pixel data $h(k)$, said calculating means calculates the color component $hi(k)$ by $$hi(k) = \alpha \cdot Ci(k) + \Sigma \beta j \cdot Sji$$

where $\Sigma$ is a sum total related to a variable j, variable j=0, 1, ..., n−1, and $\alpha$ and $\beta j$ are predetermined coefficients.

26. The apparatus according to claim 24, further comprising smoothing means for smoothing the input color image data, and wherein said interpolating means interpolates the input image data smoothed by said smoothing means.

27. The apparatus according to claim 24, wherein said selecting means selects the representative colors by evaluating a color difference of each input pixel data in the processing unit block.

28. The apparatus according to claim 27, wherein said selecting means selects a combination by which the color difference of each input pixel data in the processing unit block is a maximum.

29. An image processing method of inputting color image data and generating color image data having a higher resolution than a resolution of the input color image data, comprising the steps of:

a selection step of selecting representative colors from a processing unit block constituted by a pixel of interest and nearest neighbor pixels thereof in the input color image data, the number of representative colors being less than the number of pixels constituting the processing unit block and at least two;

an interpolation step of interpolating the pixel of interest on the basis of the input color image data in the processing unit block to generate a plurality of interpolated pixel data; and a calculation step of calculating data of a color component i of output pixel data by performing a product-sum operation using data of the color component i of the interpolated pixel data and data of the color component i of the representative colors selected in the selection step.

30. A storage medium storing program codes for inputting color image data and generating color image data having a higher resolution than a resolution of the input color image data, the program codes comprising:

code for selecting representative colors from a processing unit block constituted by a pixel of interest and nearest neighbor pixels thereof in the input color image data, the number of representative colors being less than the number of pixels constituting the processing unit block and at least two;

code for interpolating the pixel of interest on the basis of the input color image data in the processing unit block to generate a plurality of interpolated pixel data; and code for calculating data of a color component i of output pixel data by performing a product-sum operation using data of the color component i of the interpolated pixel data and data of the color component i of the representative colors selected by said selecting code.

* * * * *

UNITED STATES PATENT AND TRADEMARK OFFICE
CERTIFICATE OF CORRECTION

PATENT NO. : 6,157,749
DATED : December 5, 2000
INVENTOR(S) : Miyake

It is certified that error appears in the above-identified patent and that said Letters Patent is hereby corrected as shown below:

Title page,
Title,
"STORING" should read -- STORAGE --.

Foreign Application Priority Data:

"Jun. 4, 1997   [KP]   DPR of Korea   9-146719" should read

-- Jun. 4, 1997   [JP]   Japan   9-146719 --.

Column 1,
Line 2, "STORING" should read -- STORAGE --;
Line 26, "E=(1-i) (1-j) A+i) • (I-j) B+j•(1-i) C+ijD" should read
-- E= (1-i) (1-j) A+i• (I -j) B+j• (1-i) C+ijD --.

Column 8,
Line 52, "recent" should read -- in recent --.

Column 10,
Line 47, "is" should read -- are --.

Column 11,
Line 26, "in illustrated" should read -- is illustrated --.

Column 16,
Line 25, "can e" should read -- can be --; and
Line 61, "widow" should read -- window --.

Column 17,
Line 15, "necessary" should read -- necessarily --.

Column 18,
Line 34, "loose" should read -- lose --.

UNITED STATES PATENT AND TRADEMARK OFFICE
CERTIFICATE OF CORRECTION

PATENT NO.  : 6,157,749
DATED       : December 5, 2000
INVENTOR(S) : Miyake

It is certified that error appears in the above-identified patent and that said Letters Patent is hereby corrected as shown below:

Column 19,
Line 8, "hi (k) = ($\alpha$Ci (k) +$\beta$MAX (Pi, Qi) / ($\alpha$+$\beta$)" should read -- hi (k) =($\alpha$Ci (k) +$\beta$MAX (Pi, Qi)) / ($\alpha$+$\beta$) --; and Line 14, "hi (k) = ($\alpha$Ci (k) +$\beta$MIN (Pi, Qi) / ($\alpha$+$\beta$)" should read -- "hi (k) =($\alpha$Ci (k) +$\beta$MIN (Pi, Qi) ) / ($\alpha$+$\beta$) --.

Signed and Sealed this

Sixth Day of November, 2001

*Attest:*

*Nicholas P. Godici*

*Attesting Officer*

NICHOLAS P. GODICI
*Acting Director of the United States Patent and Trademark Office*